(12) United States Patent
Pollack

(10) Patent No.: US 11,595,612 B2
(45) Date of Patent: *Feb. 28, 2023

(54) CREATING AND DISSEMINATING OF USER GENERATED CONTENT OVER A NETWORK

(71) Applicant: Playvuu, Inc., Redondo Beach, CA (US)

(72) Inventor: Shane Pollack, Bell Canyon, CA (US)

(73) Assignee: PlayVuu, Inc., Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/152,442

(22) Filed: Jan. 19, 2021

(65) Prior Publication Data
US 2021/0144332 A1    May 13, 2021

Related U.S. Application Data

(63) Continuation of application No. 16/248,687, filed on Jan. 15, 2019, now Pat. No. 10,931,911, which is a continuation of application No. 12/953,350, filed on Nov. 23, 2010, now abandoned.

(60) Provisional application No. 61/364,500, filed on Jul. 15, 2010.

(51) Int. Cl.
*G06F 3/0481* (2022.01)
*H04N 5/76* (2006.01)
*G11B 27/034* (2006.01)

(52) U.S. Cl.
CPC ............. *H04N 5/76* (2013.01); *G11B 27/034* (2013.01)

(58) Field of Classification Search
CPC ........ G11B 27/034; G06F 3/0481; H04N 5/76
See application file for complete search history.

(56) References Cited

U.S. PATENT DOCUMENTS

| | | | | |
|---|---|---|---|---|
| 5,867,494 A | * | 2/1999 | Krishnaswamy | ........ H04Q 3/64 |
| | | | | 379/114.15 |
| 6,546,556 B1 | * | 4/2003 | Kataoka | ................. H04N 7/165 |
| | | | | 725/35 |
| 6,687,694 B2 | * | 2/2004 | Miller | .................... G06V 10/94 |
| | | | | 707/700 |
| 6,981,050 B1 | * | 12/2005 | Tobias | .............. H04L 29/06027 |
| | | | | 348/E7.071 |
| 7,925,973 B2 | * | 4/2011 | Allaire | ............... H04N 21/6125 |
| | | | | 715/201 |

(Continued)

Primary Examiner — Phenuel S Salomon
(74) Attorney, Agent, or Firm — Lynch LLP

(57) ABSTRACT

Disclosed herein are methods and systems for creating and disseminating of audio and video content generated by a user over a network. In one aspect of the present disclosure, a request to create audio content over a network is received. In another aspect of the present disclosure a request to create multimedia content comprising audio and video content over a network is received. One embodiment includes presenting the user with a plurality of compositions, receiving a request from the user to add a specific composition, presenting a lyric using text submitted by the user, recording an audio recording generated by the user, wherein the specific composition is playing during the recording of the audio recording, and providing editing capability to the specific composition, the song lyric and audio recording.

17 Claims, 23 Drawing Sheets

(56) References Cited

U.S. PATENT DOCUMENTS

| | | | |
|---|---|---|---|
| 2004/0243817 A1* | 12/2004 | Hasegawa | G11B 27/034 713/193 |
| 2006/0212148 A1* | 9/2006 | Fitzgerald | G06F 16/68 381/56 |
| 2006/0253542 A1* | 11/2006 | McCausland | H04L 51/04 709/207 |
| 2008/0086689 A1* | 4/2008 | Berkley | G06F 16/986 715/201 |
| 2008/0109306 A1* | 5/2008 | Maigret | G06Q 30/0277 705/14.46 |
| 2008/0113797 A1* | 5/2008 | Egozy | A63F 13/358 84/600 |
| 2008/0307454 A1* | 12/2008 | Ahanger | H04N 21/854 725/36 |
| 2009/0069913 A1* | 3/2009 | Stefik | G06F 16/635 700/94 |
| 2009/0106429 A1* | 4/2009 | Siegal | G11B 27/034 709/227 |
| 2009/0150797 A1* | 6/2009 | Burkholder | G06Q 10/10 715/747 |
| 2009/0164034 A1* | 6/2009 | Cohen | G10H 1/0025 700/94 |
| 2009/0164902 A1* | 6/2009 | Cohen | G10H 1/0058 715/716 |
| 2010/0027961 A1* | 2/2010 | Gentile | H04N 5/272 348/584 |
| 2010/0028846 A1* | 2/2010 | Cohen | G09B 5/065 434/323 |
| 2010/0045791 A1* | 2/2010 | Drive | G06F 40/205 348/143 |
| 2011/0053688 A1* | 3/2011 | Crawford | A63D 5/04 463/31 |
| 2011/0246937 A1* | 10/2011 | Roberts | G11B 27/322 715/810 |
| 2011/0296473 A1* | 12/2011 | Babic | H04N 21/21 709/224 |
| 2011/0296474 A1* | 12/2011 | Babic | H04N 21/21 725/87 |

* cited by examiner

FIG. 10

CREATING AND DISSEMINATING OF USER GENERATED CONTENT OVER A NETWORK

This application is a continuation of U.S. patent application Ser. No. 16/248,687 filed on Jan. 15, 2019, which is a continuation of U.S. patent application Ser. No. 12/953,350 filed on Nov. 23, 2010, and claims priority to U.S. Provisional Patent Application No. 61/364,500 entitled, "CREATING AND DISSEMINATING OF USER GENERATED MEDIA OVER A NETWORK AND FOR COLLABORATION," which was filed on Jul. 15, 2010, the contents of which are expressly incorporated by reference herein.

BACKGROUND

Traditional models of creating and publishing music involve a sound studio where individuals, artists, or groups record musical works. The process of creating music can involve recording the song and then editing and/or mixing the song to achieve a desired result or simultaneous recording and mixing/editing on the fly. Individual tracks of instruments, vocals, sound effects, beats, sections from other pre-recorded productions, etc. are often synchronized to produce an ideal result. The intricacies of music production and the technology behind it innately create immense difficulty and challenges to aspiring artists, musicians, and songwriters. For instance, artists must express themselves in the confines of an established recording studio. As a result, the timing of the recording session, the location and environment of the recording studio must be conducive to the artist's creativity. Moreover, traveling to an established studio often entails effort, expense, and lost time, all of which may be unfavorable for the development of a burgeoning artist. The lack of technical expertise is also an obstacle which may impede the aspects of audio and video creation.

Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWING

These and other objects, features and characteristics of the present invention will become more apparent to those skilled in the art from a study of the following detailed description in conjunction with the appended claims and drawings, all of which form a part of this specification. In the drawings:

FIG. 10 illustrates an example user interface having an audio/multimedia player/recorder capable of processing an audio recording.

Figure 1:
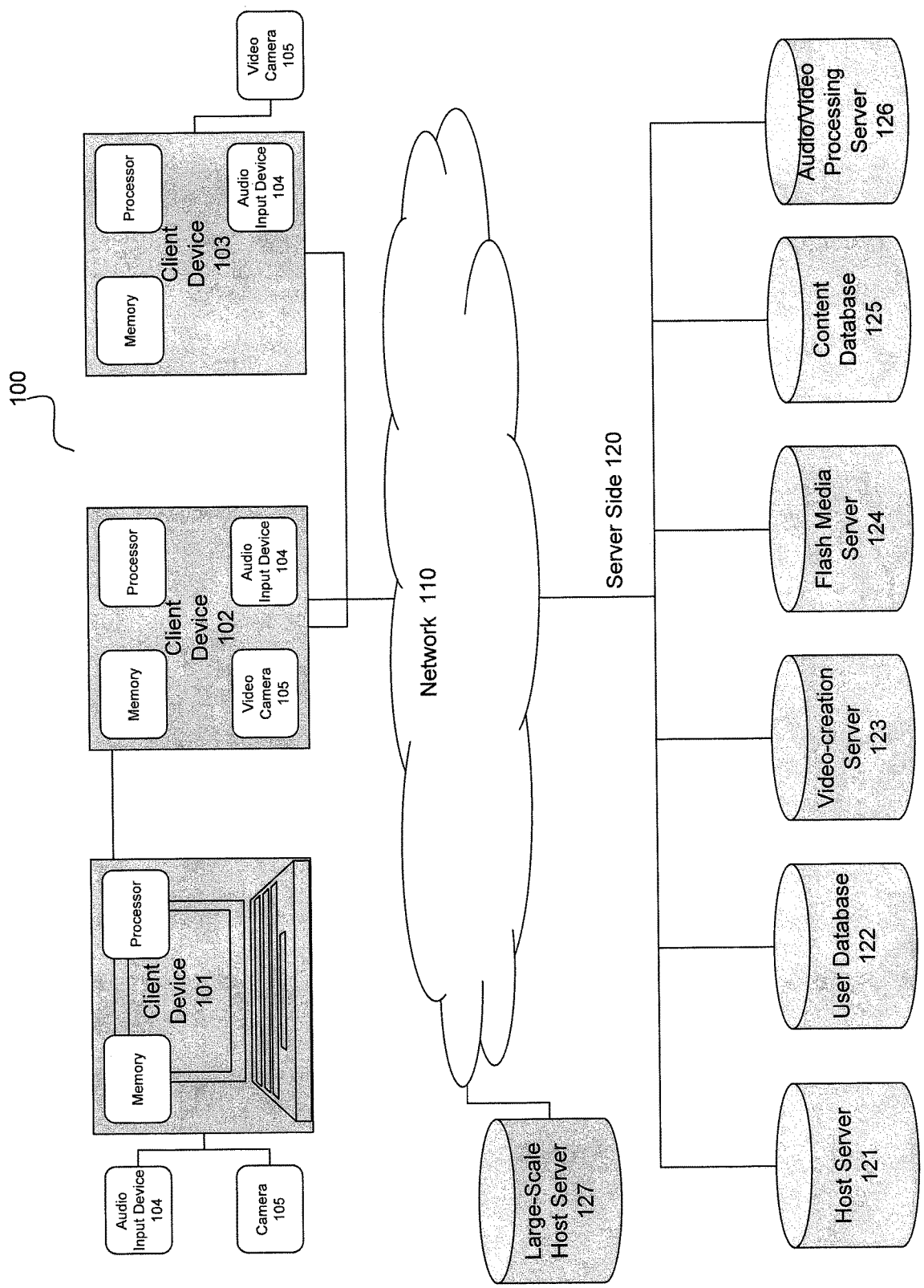
FIG. 1 illustrates a block diagram of client devices coupled to one another and server-side devices to facilitate generation of audio and video content over a network.

The headings provided herein are for convenience only and do not necessarily affect the scope or meaning of the claimed invention.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION OF THE INVENTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but are not necessarily, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase, "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for anyone or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for enabling a user to generate audio content over a network.

In one aspect, the present disclosure relates to using a network for generating audio and video content over a network.

In first creating an audio content, a request is sent by a user to start the creation process. In one embodiment, a user is asked to upload a pre-recorded audio content. In another embodiment, a user does not have a final audio content and the user is then prompted to create audio content.

The user must select from a list of compositions (e.g., pre-recorded beats, rhythms, scores). The composition may be a retrieved from a library of compositions, provided (e.g., recorded) by another member on the network. In one embodiment, the process of selecting a composition allows the user to view a list of compositions and to preview the sound of each pre-recorded composition.

A feature of an embodiment enables a user to enter original lyrics for an audio content. In one embodiment, a lyric mechanism prompts the user to enter the text of the original lyrics in a query box. In another embodiment, song lyrics can be automatically generated by the lyric mechanism whereby the user provides one or more key words.

The voice recording may be audibly generated (e.g., sang) or generated by a pre-recorded song or audio content. Audio recordings can be produced by a user in the vicinity of an audio input device (e.g., microphone) that is coupled to a computing device connected to a network. The audio content can be uploaded or recorded and can be instrumental, electronic, rap, lyrical, chorus, acapella, etc. When the user is ready to record, the user can, by the click of a button (e.g., the 'record button') on the user interface, trigger a countdown to when the recording session will begin. The recording session may occur live over the network once the countdown commences. The user can begin the audio recording production process (e.g., sing, rap, talk, play an instrument, play music, compose, direct a band, DJ, and/or otherwise generate any form of audio content) in the vicinity of an audio input device (e.g., microphone coupled to the computing device). The user-generated and/or provided audio content can then be recorded over the network in or near real-time.

The recording session of an audio or video recording, or a combination thereof, can be initiated via the user interface, by clicking a button on the audio recorder/player for example. Before the recording session begins, playback of an audio recording or a video recording is typically stopped if playback is currently occurring. Once playback has paused/stopped, the user is provided with a countdown indicator to the initiation of the recording session. At the initiation of the recording session, the composition, prerecorded composition or video recording is playing. When the recording session has ended (e.g., by user request), the recording user has the option of previewing the recorded content. If the user recorded over a pre-recorded composition or pre-recorded video recording, the user can listen to or view the results of the audio and video synchronization.

Once the user has completed the recording process, a preview of the recording (e.g., audio or video) can be played back to the user over the network to the user. Typically, the recorded content is stored in a buffer (e.g., memory buffer) when being played for preview. The user can adjust the volume level of the recorded content based on the preview and the user can apply a special sound effect to the audio or video recorded. If and when the recording is satisfactory to the user, the recording can be permanently saved. If the user chooses to discard the recorded content, it can be deleted from memory. In some instances, the user can choose to re-record the same content until satisfactory results are obtained.

The recording can be saved upon user request, for example, when the user determines that the recording is satisfactory. The user can make the completed product of the audio or video content accessible to other users via the network interface and provide comments and/or ratings.

In one aspect, the present disclosure relates to providing a mechanism for users to access audio content and video contents of others and in some instances, use the work of others to generate collaborative content via a service site hosted by a web-portal. Because an audio content may be the collaborative result of multiple member users over a network, the users need not be physically proximal to one another to participate in a musical collaboration session. For example, an audio or video content can be a product of one member user providing an audio content and another member user that user's audio content as a composition in his own audio content. The audio or video content can also be a product of a pre-recorded compositions and video recordings by other member users.

When a multi-media file is permanently saved upon user request, the user can determine whether the work is accessible by other users. The user can select the privacy attribute associated with the audio content and/or video content. For example, the recording user can make the recorded content publicly accessible (e.g., can be aurally played by other members) or private (e.g., only visible to the user and/or can only be played by the user).

Referring to the first figure, FIG. 1 illustrates a block diagram of the system 100, in accordance to one embodiment. There are client devices 101, 102, 103 that serve as the interface to a user. A user may operate a computer, a server and/or any other device that is able to establish a connection with another device, to access the embodiment. For example, the client devices and content providers can be, but are not limited to, a server desktop, a desktop computer, a computer cluster, a mobile computing device such as a notebook, a laptop computer, a handheld computer, a mobile phone, a smart phone, a PDA, a Blackberry device, a Treo, iPhone and/or an iPad, etc. The client devices 101-103 typically include a display or another output functionality to present data exchanged between the devices to a user.

In one embodiment, an audio input device 104 is coupled to the client device 101-103. The audio input device, such as microphone, 104 can be a component of the client device 101-103 or can be connected through wired or wireless means to capture audio or voice content for uploading to the server side 120.

In one embodiment, an imaging device or camera 105 (e.g., video camera, web-cam, video recorder) is also connected to the client device 101-103. The camera 105 can be an internal component of the client device 101-103 or can be attached to the client device 101-103 using a wired or wireless means to capture video for uploading to the server side 120. In one embodiment, the camera 105 is attached to the client device 101-103 for use in the generation of video.

In one embodiment, the client devices 101-103 are coupled to a network 110. The network, in the present example, is the internet. It is to be understood that this link 110 need not actually be the internet. Any small or large-scale network or other connection mechanism will do. So, in some embodiments, the client devices 101-103 may be directly connected to one another.

The network 110, over which the client devices 101-103 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 110 can be any collection of distinct networks operating wholly or partially in conjunction to provide connectivity to the client devices 101-103 and servers, and may appear as one or more networks to the serviced systems and devices. In one embodiment, communications to and from the client devices 101-103 can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCPIIP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client devices 101-103 can be coupled to the network 110 (e.g., Internet) via a dial up connection, a digital subscriber loop (DSL, ADSL), cable modem, and/or other types of connection. Thus, the client devices 101-103 can communicate with remote servers (e.g., web server, host server, mail server, instant messaging server) on the server side 120 that provides the user access to the World Wide Web via a web browser, for example.

Next, the server side 120 functionality is depicted. The server-side 120 functionality may consist of a single hardware server, a plurality of hardware servers in the same location, or a plurality of hardware servers in different locations. There are numerous servers or programs running on the server-side 120 and these hardware servers may be capable of communication with each other.

Within the server-side, a host server 121 is depicted. The host server facilitates the generation of audio and video content over a network. The host server is used to respond to requests from a client device 101-103 for web-pages. In response, the host server 121 provides information to the client device 101-103 and all other individuals with whom the content is shared.

Also on the server-side 120 is a user database to keep track of server-side information such as usernames, passwords, XML files, statistics and project names. The user database 122 and content database 125 can store software, descriptive data, images, system information, drivers, and/or any other data item utilized by parts of the host server 121 for operation. The content database 125, in conjunction with the user database 122, may also store user information and user content, such as, user profile information, subscription information, audio files, and/or data related to the user content (e.g., statistical data, file attributes, timing attributes, owner of the content, etc.). The user database 122 and content database 125 may be managed by a database management system (DBMS), including but not limited to, Oracle, 082, Microsoft Access, Microsoft SQL Server, PostgreSQL, MySQL, FileMaker, etc.

The databases 122, 125 can be implemented via object-oriented technology and/or via text files, and can be managed by a distributed database management system, an object-oriented database management system (OODBMS) (e.g., ConceptBase, FastDB Main Memory Database Management System, JDOlnstruments, ObjectDB, etc.), an object-relational database management system (ORDBMS) (e.g., Informix, Openlink Virtuoso, VMDS, etc.), a file system, and/or any other convenient or known database management package.

The host server 121 is, in some embodiments, able to communicate with client devices 101-103 via the network 110. In addition, the host server 121 is able to retrieve data from the user database 122 and the content database 125. In some embodiments, the host server 121 is able to facilitate the generation of audio and video content, multimedia-content sharing over a network (e.g., the network 110) among various users of the client devices 101-103. The host server 121 can store multimedia content to be provided to other users, for example, for on-demand audio and/or video playback and recording. For example, users can listen to audio content or view video content shared by other users. Users can also, in some embodiments, record voice or audio recordings over pre-recorded compositions comprising of beats or melodies—otherwise known as generating audio content. These compositions may be provided by other users stored on the host system over a network. These recording sessions can be conducted in real-time or near real-time as the user is generating the audio or video content, for example.

In one embodiment, an audio and video processing server 126 is on the server-side 120. This server 126 may, in fact, comprise of multiple servers, each dedicated to a particular format or file type. In one embodiment, the audio and video processing server 126 is one server and provides functionality capable of editing audio and video, such as automatically creating transitional cross-fades between edits and performing the edits or "recording" of the audio and/or video itself. Because all of the editing and storage takes place server side 120, the audio and video processing server 126 is responsible for making these edits as instructed by the user and storing the content.

In one embodiment, a video creation server 123 is on the server side. This server 123 is dedicated to accepting information such as media files from a remote location that is intended to be stored as video and can process a set of editing instructions on the media files. It is set-up in such a way as to automatically create a pre-determined size and type of video such that the video will be relatively high-quality and yet have a small file size. In one embodiment, the video creation server 123 encodes the video file to be streamable over a network. The video creation server 123 can create a streamable media file that can be played with HTML5, Javascript or Flash, and thus can be played on a variety of client devices 101-103 such as the iPhone or iPad. In one embodiment, this video creation server 124 creates Flash video content that is designed to be played on a Flash player and to be served by a Flash media server 124.

In one embodiment, the Flash media server 124 is on the server side 120 and is responsible for serving Flash media to the user as he or she moves through the audio and video content creation process. Additionally the Flash media file server 124 is responsible for providing the Flash media to subsequent users once it has been published and/or shared. The Flash media server 124 is capable of retrieving and displaying the stored video. The video can be stored on the user database 122, content database 125 or can also be stored on a large scale host server 127 which provides large scale content-caching capability and ensures content is available quickly to an end-user.

Figure 2:
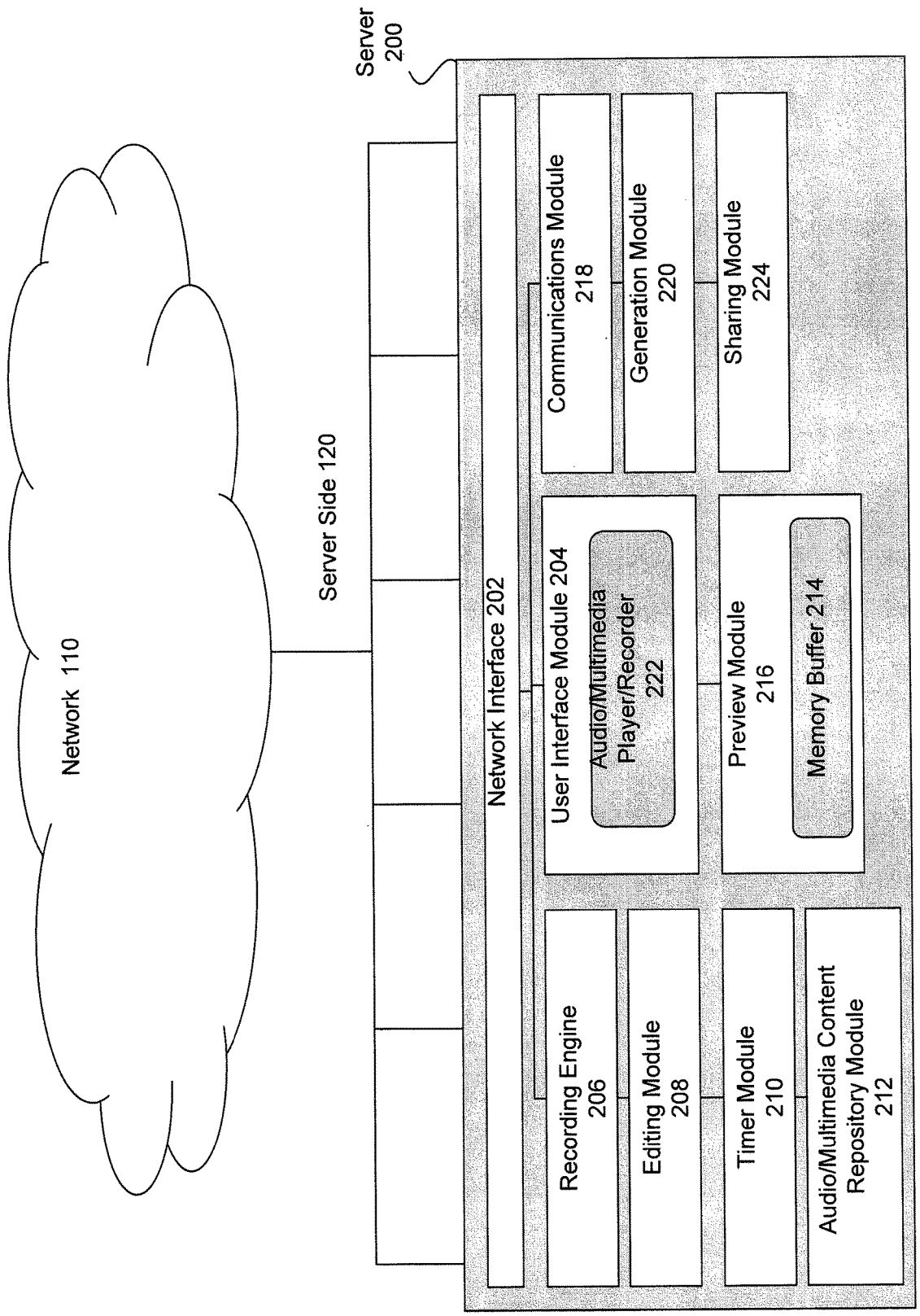
FIG. 2 illustrates a block diagram of a system of at least one server device on the server-side to facilitate generation of audio and video content over a network. The at least one server 200 on the server-side 120 includes a user content.

FIG. 2 illustrates a block diagram of a system of one or many server devices on the server-side to facilitate generation of audio and video content over a network. The server(s) 200 include/s a communications module 218 or a combination of communications modules communicatively coupled to the network interface 202 to manage a one-way, two-way, and/or multi-way communication sessions over a plurality of communications protocols. In one embodiment, the communications module 218 receives data (e.g., audio recordings, video recordings, textual data, audio content, video content, etc.), information, commands, requests (e.g., video, and/or audio-based), and/or text-based messages over a network 110. In one embodiment, the communications module 218 receives communications from a network 110 (e.g., Internet, wired and/or wireless network) initiated via a web-interface.

Since the communications module 218 is typically compatible with receiving and/or interpreting data originating from various communication protocols, the communications module 218 is able to establish parallel and/or serial communication sessions with users of remote client devices for data exchange (e.g., user information and/or user content).

In addition, the communications module 218 can manage log-on requests received from one or more users browsing the audio and/or video content generator. In one embodiment, the communications module 218 is able to receive and further manage/process receiving a request from a user to generate audio and/or video content. A connection is typically maintained with a user device until the user leaves the site. In one embodiment, when a user wishes to record an audio or video recording, the communications module 218 prompts the user for permission to access peripheral devices (e.g., microphone, camera, webcam, camcorder, etc.) connected to the user device.

When the communications module 218 is able to access the microphone, the audio detected by the microphone can be recorded over a network. Similarly, when the communications module 218 is able to access the imaging device (e.g., camera, webcam, camcorder), the audio detected by the microphone can be recorded over a network. The communications module 218, can include, one or more of, or any portion of the one or more of the above described functions, without deviating from the spirit of the novel art of the disclosure.

One embodiment of the present disclosure includes a recording engine 206. The recording engine 206 can be any combination of hardware components and/or software agents able to record multimedia (e.g., audio, text, image, and/or video) content for example, over a network connection (e.g., Internet). The audio-based content maybe user-generated (e.g., sang, spoken, played, etc.) content provided by the recording user. The recording engine 206, can, for example, establish a connection with a user device through the communications module 218. Upon detection of an audio or a video input device (e.g., microphone, camera, webcam, camcorder, transducer, sensor) coupled to the user device, the recording engine 206 can record audio and/or video input (e.g., voice, speech, sound, dialogue, music, instruments music, rhythms, song, rap, melody, theatrical performance, movie, play, an act, a skit, etc.) detected by the audio and/or video input device.

In some instances, the recording engine 206 is able to receive user inputs and react in response to user inputs. For example, the recording engine 206 detects that a user has requested a recording session (e.g., requested via an audio/multimedia player/recorder) 222 and whether the user interface is accessible. If not, the recording engine 206 can request the user for access to the input device.

Once the user requests to record an audio or a video recording, the recording engine 206 presents an indication of the initiation of the recording session. For example, the recording engine 206 can countdown to the initiation and present an indicator (e.g., visual and/or aural indicator) of the countdown status. When countdown ends, the recording engine 206 begins to record audio and/or video detected from the audio and/or video input device. In one embodiment, the recording session begins when the user generates the request without additional indication provided by the recording engine 206. During a recording session, the recording engine 206 can perform simultaneous aural playback of a composition to the recording user during a recording session when the recording user has requested to record over the composition.

The recording engine 206 can also terminate the recording session. In some embodiments, the recording engine 206 is coupled to a timer module 210 to keep track of recording time, countdown time, and/or playing time, etc. The timer module 210 may be internal to the recording engine 206. In addition, the recording session can be terminated in response to receiving a user request (e.g., by the click of a button on the user interface).

The timer module 210 can be any combination of hardware components and/or software agents able to determine relative and/or absolute time. The timer module 210, in some embodiments, tracks the time elapsed. In addition, the timer module 210, in some embodiments, externally couples to a time server (e.g., World Time Server, NTP time server, U.S. Time server, etc.) to keep track of time. The timer module 210 is, in some embodiments, accessible by the recording engine 206 and/or the editing module 208 to track recording time and/or playback time. In some instances, elapsed time is usually displayed during audio and video recordings.

One embodiment of the present disclosure includes a preview module 216. The preview module 216 can be any combination of hardware components and/or software agents able to perform playback of multimedia content such as playback of recorded content and/or simultaneous playback of multiple pieces of multimedia content (e.g., audio, image, video, etc.). In some instances, the preview module 216 includes memory (e.g., volatile and/or non-volatile) and/or storage unit (e.g., magnetic disk drive, optical disk drive, etc.) for storing multimedia content (e.g., audio, video, image or the like). In one embodiment, the preview module 216 includes a memory buffer 214. Multimedia content stored in the preview module 216 may be stored temporarily (e.g., in the memory buffer 214) during preview and/or further until the user decides to save or discard the stored content. The stored content can include recorded or uploaded audio, image, and/or video content, for example.

The preview module 216 is also, in some embodiments, coupled to the audio/multimedia content repository module 212 to access multimedia content stored in the repository. The preview module 216 is, in some embodiments, able to receive, manage, and/or execute a request to preview a particular audio content, composition, or video content. A preview typically occurs after a new recording or a new upload of a composition, audio, or video recording. After the preview, the preview module 216 can discard or save the file based on user request. In some embodiments, a preview occurs for pre-recorded compositions whereby the content is previously created and was previously stored in the audio/multimedia repository module 212.

In one embodiment, the preview module 216 provides a preview/aural playback of an audio recording after the recording session has ended. The preview module 216 also enables a recording user to preview how the synchronization of a composition and an audio recording would sound like when played together by performing simultaneous aural playback of the audio recording and the composition (e.g., beat). Similarly, the preview module 216 could further enable a recording user to preview the synchronization of audio content/recording along with a video recording/content. The preview would thus allow the recording user to decide to save or discard the recorded content and re-record. In addition, the preview allows the user to make any adjustments to the recorded content (e.g., sound or imaging effects, fade-in, fade-out, frequency, timing, etc.). For example, the recording user can change the underlying composition and/or the timing or latency adjustment (e.g., to the beat) of the audio recording for the synchronization of the composition and audio recording.

One embodiment of the present disclosure includes a generation module 220. The generation module 220 can be any combination of hardware components and/or software agents able to perform any additional processing procedures. For example, when a user elects to synchronize an audio and/or video recording to a composition or pre-recorded video recording, the generation module 220 generates the synchronized multimedia file from a compilation of individual audio and video files. The synchronized multi-media content can be previewed by the user and subsequently stored, for example, in the audio/multimedia repository module 212 or any other memory storage unit. Prior to synchronizing, the user can configure any settings that need to be performed in the process of editing, such as special effects or latency adjustments between the audio/video recordings. In accordance to one embodiment, the audio content may be synchronized with video content from the audio/multimedia player/recorder module. The video content may be recorded or uploaded by the same individual that provided the audio content, or it may be from a different user.

The editing module 208 is able to perform audio processing including but not limited to noise reduction, fading-in, fading out, reverberation, etc. The editing module 208 can also perform video processing including, but not limited to, geometric conversions, color correction and saturation, digital compositing, de-mosaicing, white balance, noise reduction, segmenting, auto-exposure adjustment, de-interlacing, anti-flicker correction, filtering, etc. The editing module 208 can include one or more of or any portion of the one or more of the above described functions, without deviating from the spirit of the novel art of the disclosure.

The server 200 in the example of FIG. 2, in accordance with one embodiment, further includes the audio/multimedia content repository module 212. The audio/multimedia repository module 212 can be any combination of hardware modules and/or software agents able to store, playback, and/or read audio-based and other multimedia data and content, in a variety of formats, including, but not limited to, mp3, mp4, m4a, m4p, aac, wma, ra, way, ogg, flac, aiff, raw, aw, DVD, CD, Blu-Ray, HD-DVD, DTS-CD, SACO, etc. The audio/multimedia repository module 212 can be, in some embodiments, accessible by the recording engine 206, the editing module 208, and the generation module 220. For example, audio content (e.g., pre-recorded audio compositions, beats, synthesized audio tracks, speech, voice, music, mixes, etc.) can be stored in the audio/multimedia repository module 212 and accessed when the recording engine 206 will record an audio or a video recording. Video content (e.g., pre-recorded video recordings, images, video recordings, etc.) also can be stored in the audio/multimedia repository module 212 and accessed when an audio or video recording will be recorded by the recording engine 206.

Audio and video content stored in the audio/multimedia repository module 212 typically include user content (e.g., user generated and/or user provided audio/video/image content). For example, audio content can include but are not limited to, rhythms, melodies, vocal expressions (e.g., voice, speech, dialogue, sing, rap, etc.), beats, music, instrumental sounds, synthetic audio content, and/or any other type of digital and/or analog representations of sound. The audio/multimedia repository module 212 may further include digital signal processors (DSPs) that support generation of digital audio/video content modification and/or implementation of audio/video effects.

One embodiment of the present disclosure includes a user interface module 204. The user interface module 204 can be any combination of hardware components and/or software agents able to generate, modify, and/or adjust user interfaces suitable for receiving user input for querying, multimedia content recording, multimedia content exchange, multimedia content playback, collecting favorite user creations, and/or tracking favorite multimedia creation.

In some embodiments, the user interface module 204 generates, provides or presents a user interface, for a user to access additional functions and/or services such as audio/video browsing, audio/video sorting, and audio/video organizing, etc. Examples of user interfaces provided by the user interface module 214 and services accessible via the user interfaces can be visualized with further reference to the example screenshots in FIGS. 3-18 and FIG. 20.

In one embodiment, the user interface module 204 identifies user requests and displays a listing of audio content, compositions, beats, and/or video content. The user request can be generated by an action indicating whether the user wishes to browse through audio content, compositions, beats, and/or video content, for example, via clicking on an associated tab. The user interfaces showing listings of audio content, compositions, and beats are illustrated with further reference to FIGS. 3-5, respectively. The user interface module 204, in some instances, provides additional information associated with each audio content, composition, and beat in the browsing interface. Additional information can include creator, category, name, genre, and title information, etc.

Figure 3:
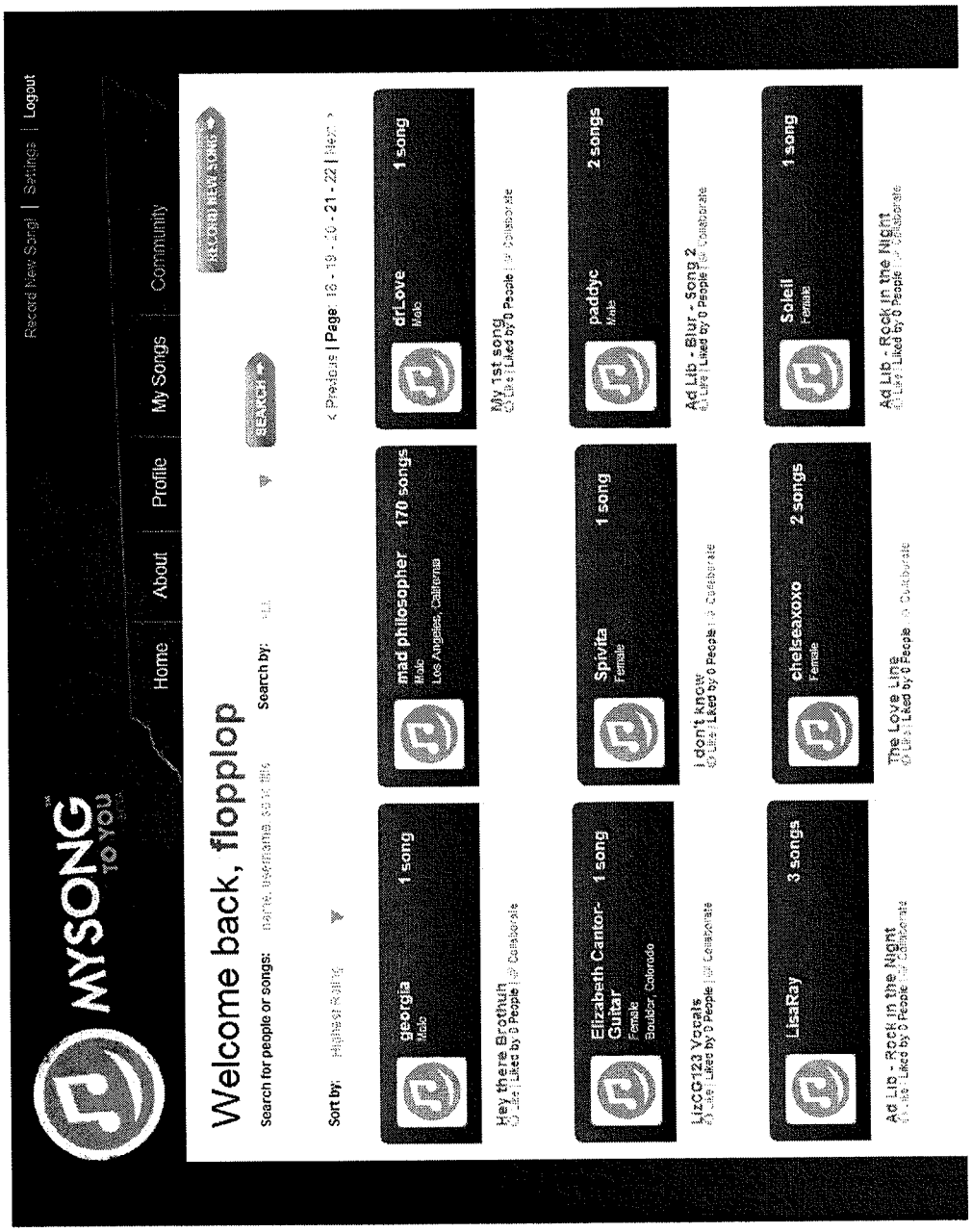
FIG. 3 illustrates an example user interface of a listing of pre-recorded audio
Figure 4:
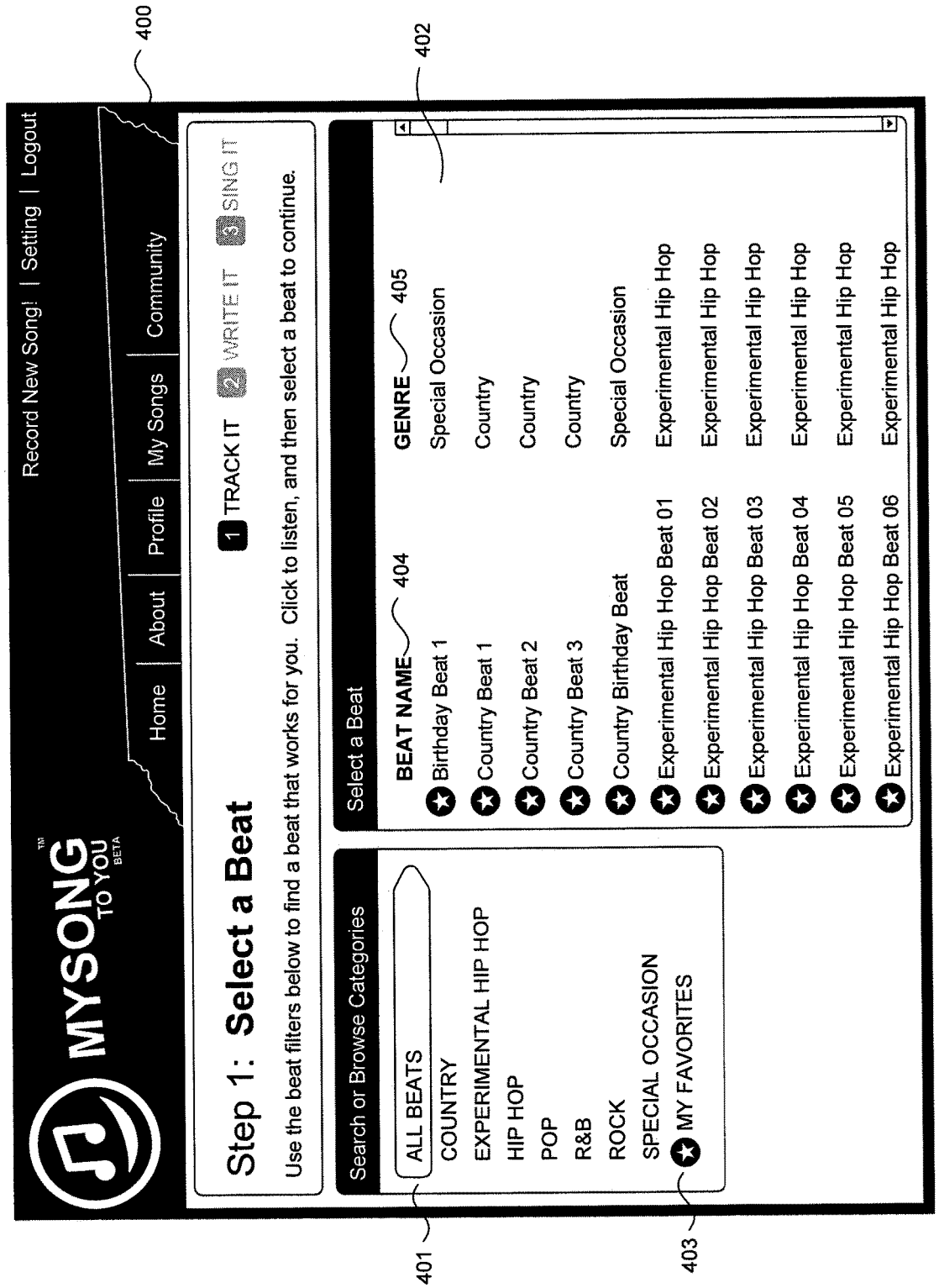
FIG. 4 illustrates an example user interface of a listing of pre-recorded compositions.
Figure 5:
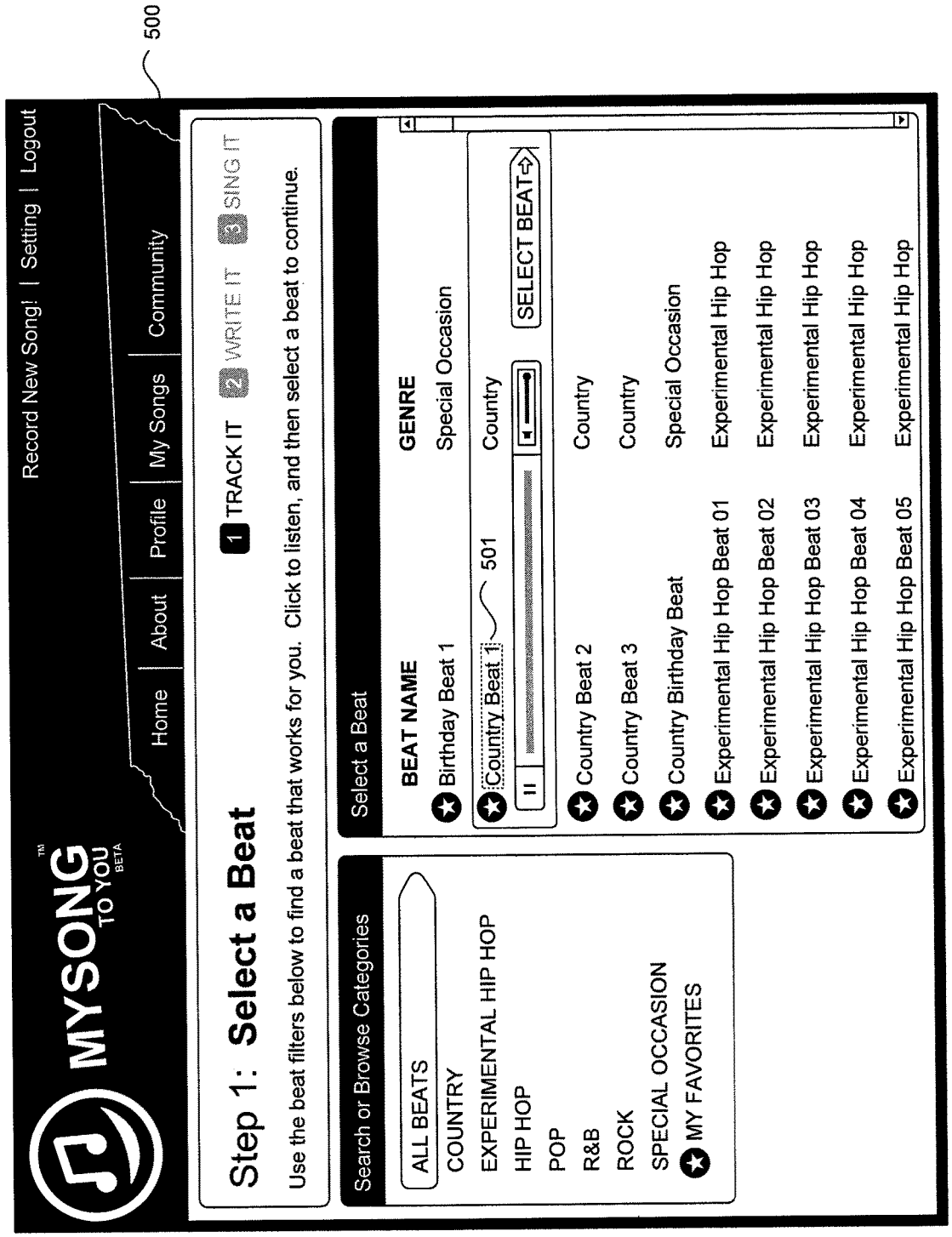
FIG. 5 illustrates an example user interface playing a composition.

The user interface module 204, in some embodiments presents a page view for the selected listing, with further reference to FIG. 3-4, and detects selection of an audio content, a composition, a beat, and/or video through the listing entries, with further reference to FIG. 5. The page view allows the user to further view detailed information regarding the selected multimedia content. The page view may further allow the user to request playback of the multimedia content. The user interface module 204 can adjust the functions and services available through the page view user interface, for example, dependent on whether the page view is for audio content, a composition, a beat, or a video recording.

In one embodiment, the user interface module 214 can generate and provide a page view in the user interface that includes a listing of entries of a set of compositions representing a melody, rhythm, score, or set of beats. With reference to FIG. 4, the page view can organize the compositions into categories. The page view can include a first window for selecting to view a category comprising a first set of compositions in a genre and a second window for selecting a specific composition listing from a subset of the first set of compositions that are a sub-category of the first category.

One embodiment of the user interface module 204 provides a user interface with an audio/multimedia player/recorder (FIG. 8-15) to facilitate multimedia content recording and playback over a network. The user interface can include a listing of selectable entries of synchronized multimedia content.

The audio/multimedia player/recorder 222 of the user interface module 214 can also generate and provide, in the same or different user interface, a play button for the playback of an audio recording or composition and/or a reverse/forward button for a user to change the timing of an audio recording over a composition. The composition can be a beat and/or melody provided by the user or another user. The audio/multimedia player/recorder 222 can further include, for example, a record button for initiating a recording session and a stop button for terminating the recording session.

The user interface module 214 can further provide a text box in the audio/multimedia player/recorder to display or receive textual input representing a set of lyrics to be sung with the audio recording and a selectable button in the audio player/recorder for updating the lyrics in the text box.

Figure 8:
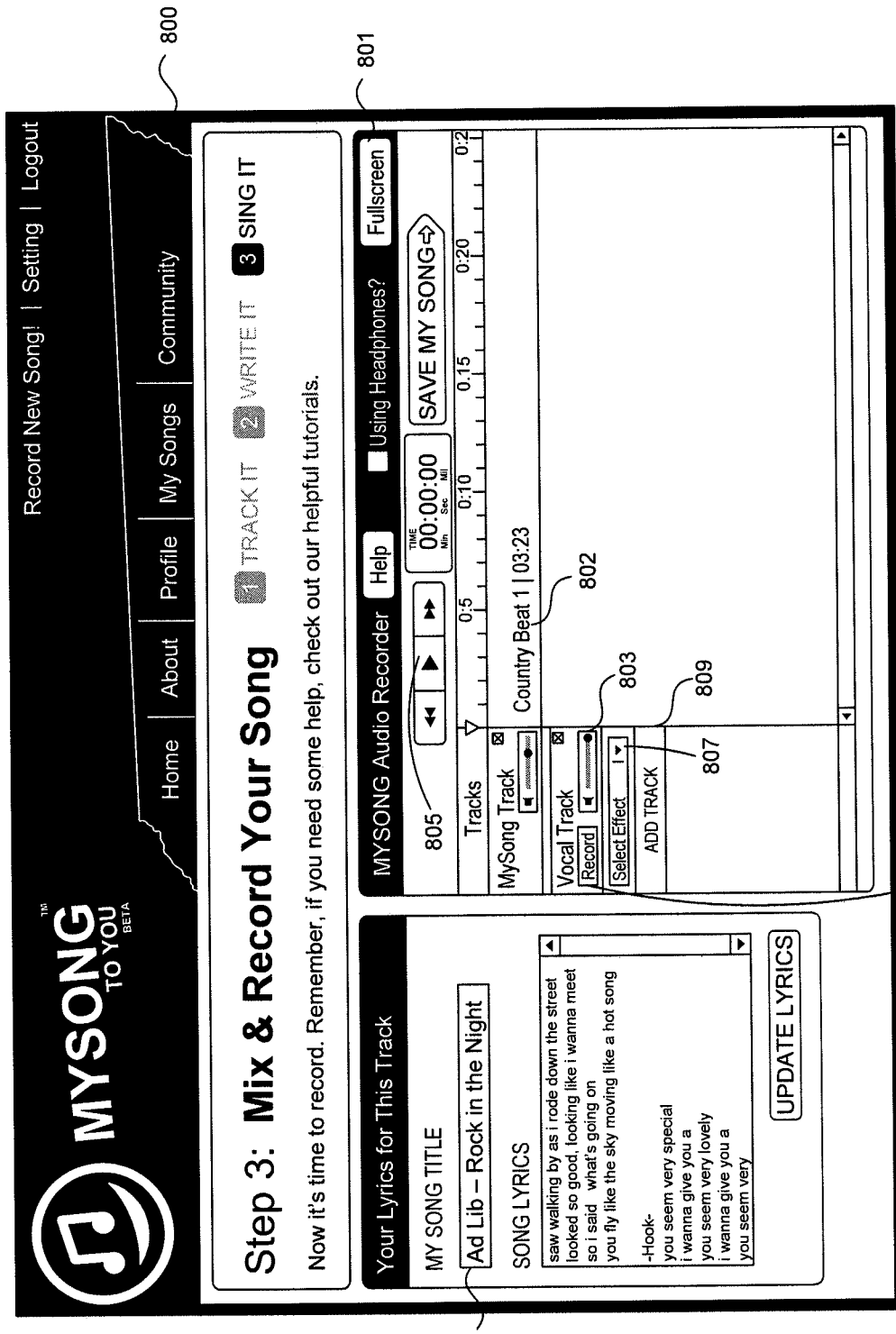
FIG. 8 illustrates an example user interface having an audio/multimedia player/recorder capable of recording an audio recording.

In some embodiments, the user interface module 214 adjusts buttons on the player according to the playback status of an audio recording, for example, with further reference to FIG. 8. When no recording is occurring, a play and/or record button can be displayed and are selectable. In addition, when a recording session has ended, for example, a re-record button, review button, cancel button and/or a play button can be displayed, with further reference to FIG. 9.

In one embodiment, an instance of the audio player (or multi-media player) can be bookmarked, for example, using any conventional or known website or web-browser including but not limited to, one or more of, Mozilla Firefox, Internet Explorer, AOL, Bookmarks, Ask MyStuff, Backflip, Blinklist, BlogMarks, delicio.us, Digg, Diigo, DropJack, Faves, Furl, Opera, Safari, Google Bookmarks, linkaGoGo, Live Favorites, My Yahoo!, Netvoiz, Newswine, Propeller, Reddit, Segnalo, Simpy, Spurl, StumbleUpon, Technorati, Twitter, and/or Yahoo! Bookmarks.

One embodiment of the present disclosure includes a sharing module 224. The sharing module 224 can be any combination of hardware components and/or software agents able to manage, track, modify, and/or enforce the privacy attributes of audio content. The sharing module 218 may receive commands related to privacy attributes of user content. The multimedia content owner (e.g., recording user of an audio or video content, etc.) typically has the ability to set the privacy attributes of owned content. The multimedia content may be shown on the user's public profile or kept as a private draft, etc., with further reference to FIG. 15.

The server 200 can be implemented using one or more processing units, such as server computers, UNIX workstations, personal computers, and/or other types of computes and processing devices. In the example of FIG. 2, the server 200 includes multiple components coupled to one another and each component is illustrated as being individual and distinct. However, in some embodiments, some or all of the components, and/or the functions represented by each of the components can be combined in any convenient and/or known manner. For example, the components of the host server may be implemented on a single computer, multiple computers, and/or in a distributed fashion.

Thus, the components of the server 200 are a functional unit that may be divided over multiple servers, computers and/or processing units. Furthermore, the functions represented by the devices can be implemented individually or in any combination thereof, in hardware, software, or a combination of hardware and software. Different and additional hardware modules and/or software agents may be included in the host server 200 without deviating from the spirit of the disclosure.

FIG. 3 illustrates an example user interface of a listing of pre-recorded audio content. The example user interface of a listing of pre-recorded audio content allows a user to select audio content that was previously recorded by the user or another user. Each listing of audio content may detail additional information about the audio content such as the title of the listing, the user whom created the listing, the number of audio content created by the user, and other descriptive details about the user. Further, the listing may allow a user to rate the specific audio content or add to the audio content through collaboration. The user can organize the listing of content according to certain parameters such as highest rating, newest song, newest user, oldest, or play count. In addition, a search query is provided wherein a name, username, song title can be entered and may be searched against defined criteria such as genres, email address, user ID, full name.

FIG. 4 illustrates an example user interface of a listing of pre-recorded compositions. The example user interface 400 of a listing of pre-recorded compositions allows a user to select a particular category of compositions 401 and specific pre-recorded composition entries 402. The listing includes multiple pre-recorded compositions based on the applied category (e.g., country, experimental hip hop, hip hop, etc.) selected. Each composition listing can include a display of information related to the composition, including but not limited to, the name of the composition 404 and genre of the composition 405. A "My Favorites" tab 403 is also selectable for a user to select pre-recorded compositions saved or bookmarked from previous sessions.

FIG. 5 illustrates an example user interface previewing a pre-recorded composition by playing the selected item. In one embodiment, each entry listing 501 of audio content is clickable by a user to request a preview of the composition associated with the entry listing. When the listing 501 is clicked, the entry expands and more information is revealed. The user interface 500 also includes selectable tabs for users to adjust the volume for the preview of the pre-recorded composition. Additional information regarding the composition such as approval, comments, and/or ratings can also be shown.

In one embodiment, each pre-recorded video recording includes a watch icon that is clickable by a user to request playback of the video associated with the entry listing. In general, the request to play a pre-recorded video recording also plays the associated audio content (e.g., voice recording(s), composition(s), etc.).

Figure 6:
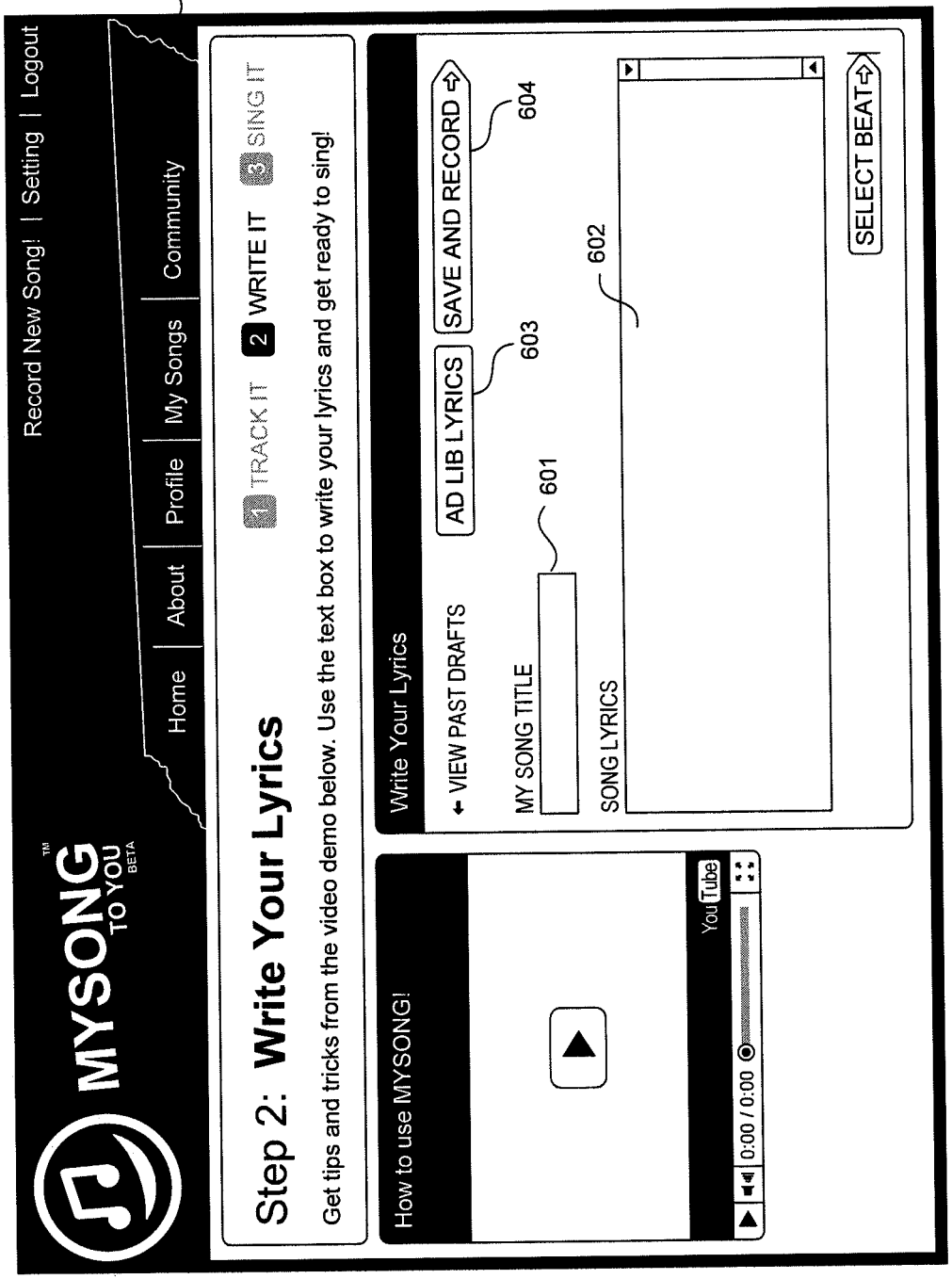
FIG. 6 illustrates an example user interface to query a user to enter lyrics.

FIG. 6 illustrates an example user interface to query a user to enter lyrics. User interface 600 is an example of a query for a user to enter original lyrics of his/her creation. The query can show multiple query fields which include, but is not limited to, the title of the song 601, the song lyrics 602, and lyrics as divided by the type of lyrics (e.g., chorus, refrain, bridge, etc.).

In addition to the option to enter one's own original song lyrics, the user interface 600 also includes selectable tabs for users to ad lib lyrics 603 and save and record 604. As will be described later the ad lib 603 option allows users can automatically generate song lyrics. Also, the save and record button 604 allows users to enter their original lyrics, save them for use later, and begin recording the audio recording.

Figure 7:
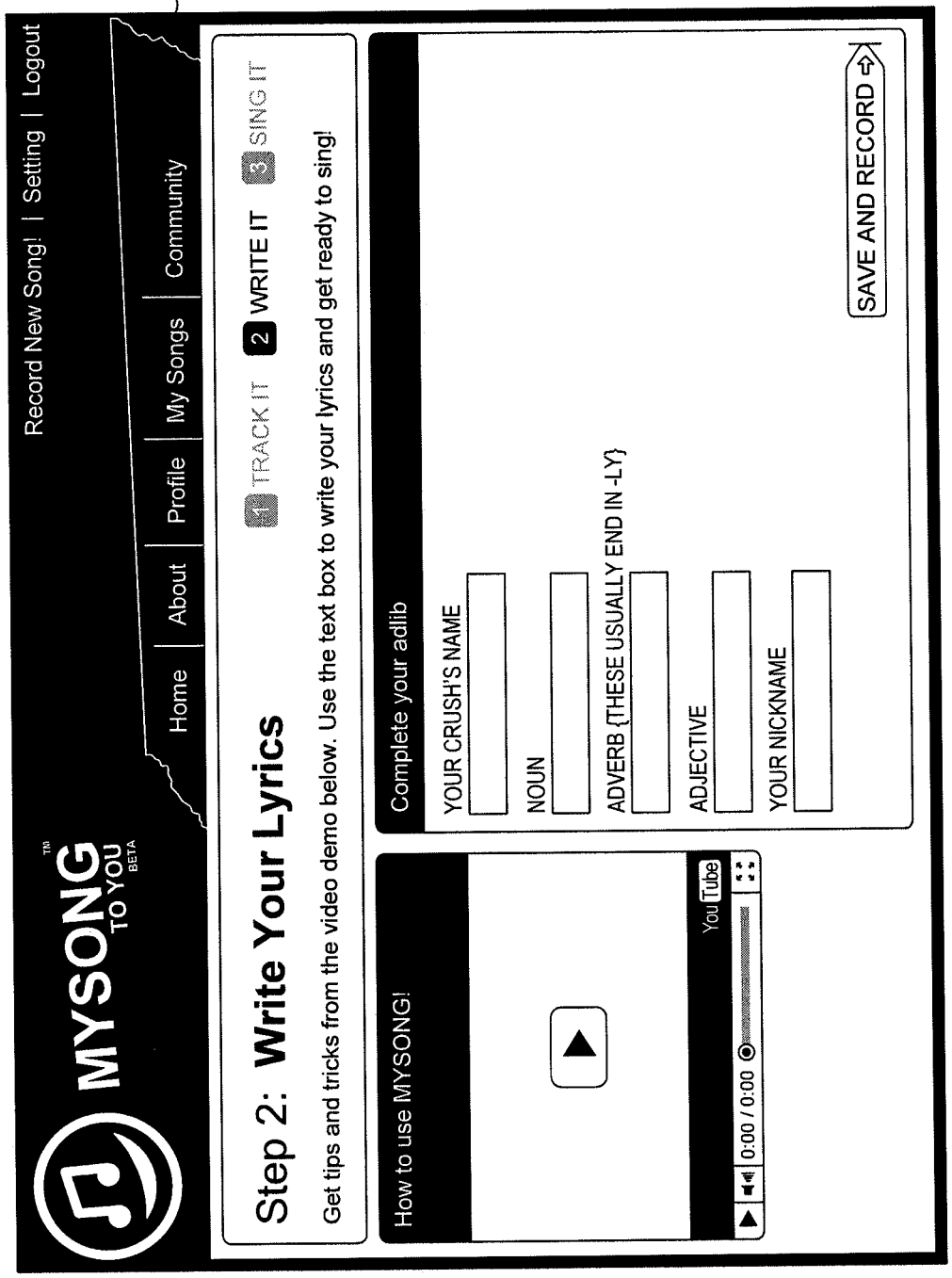
FIG. 7 illustrates an example user interface to query a user to enter keywords to automatically generate lyrics.

FIG. 7 illustrates an example user interface of a lyric generation prompt. The example user interface of user interface 700 includes text boxes, suitable for automatically generating lyrics by using text submitted by a user. Once a user has selected a pre-recorded composition, lyrics can be automatically generated upon a user's entry of a pre-defined category of words. In some embodiments, the query for automatic lyrics generation asks the user to provide the following: a crush's name, a noun, an adverb, an adjective and a nickname.

FIG. 8 illustrates an example user interface having an audio/multimedia player/recorder for recording an audio or video recording. The user interface 800 includes the audio/multimedia player/recorder 801 with selectable buttons for playing of a prerecorded composition 802 or video recording and/or recording of an audio/video recording. For example, the user can generate an audio recording (e.g., rap, sing, speak, and/or any other form of vocalization) when the record button 804 is clicked. Once the record button is selected, a recording session generally begins with the detection of the recording user's audio input device (e.g., microphone). Once the input device is accessible, the user can click the record button of the audio recorder/player (or multimedia recorder/player) to initiate a recording session over the pre-recorded beat or any other selected multimedia content. The user can stop the recording anytime by clicking the record button of the audio recorder/player.

The pre-recorded composition 802 may be played back during the recording session. A play button 805 is, in most instances, displayed when playback of audio or video is not occurring. The audio recorder/player 801, in some embodiments, also displays the name of the pre-recorded composition 802, the audio recording that is being recorded 806, the option to select an effect to apply to the audio recording 807, an adjustment of the volume of playback 803 and the option to add another audio recording 809.

In some embodiments, the user interface 800 includes a song lyric display 810 which displays the song lyrics previously entered from user interface 700 and the option to modify the song lyric entry within the same user interface 800. Other information also displayed to the user includes the title of the song and the actual words of the lyrics to facilitate the recording of the audio recording.

Figure 9:
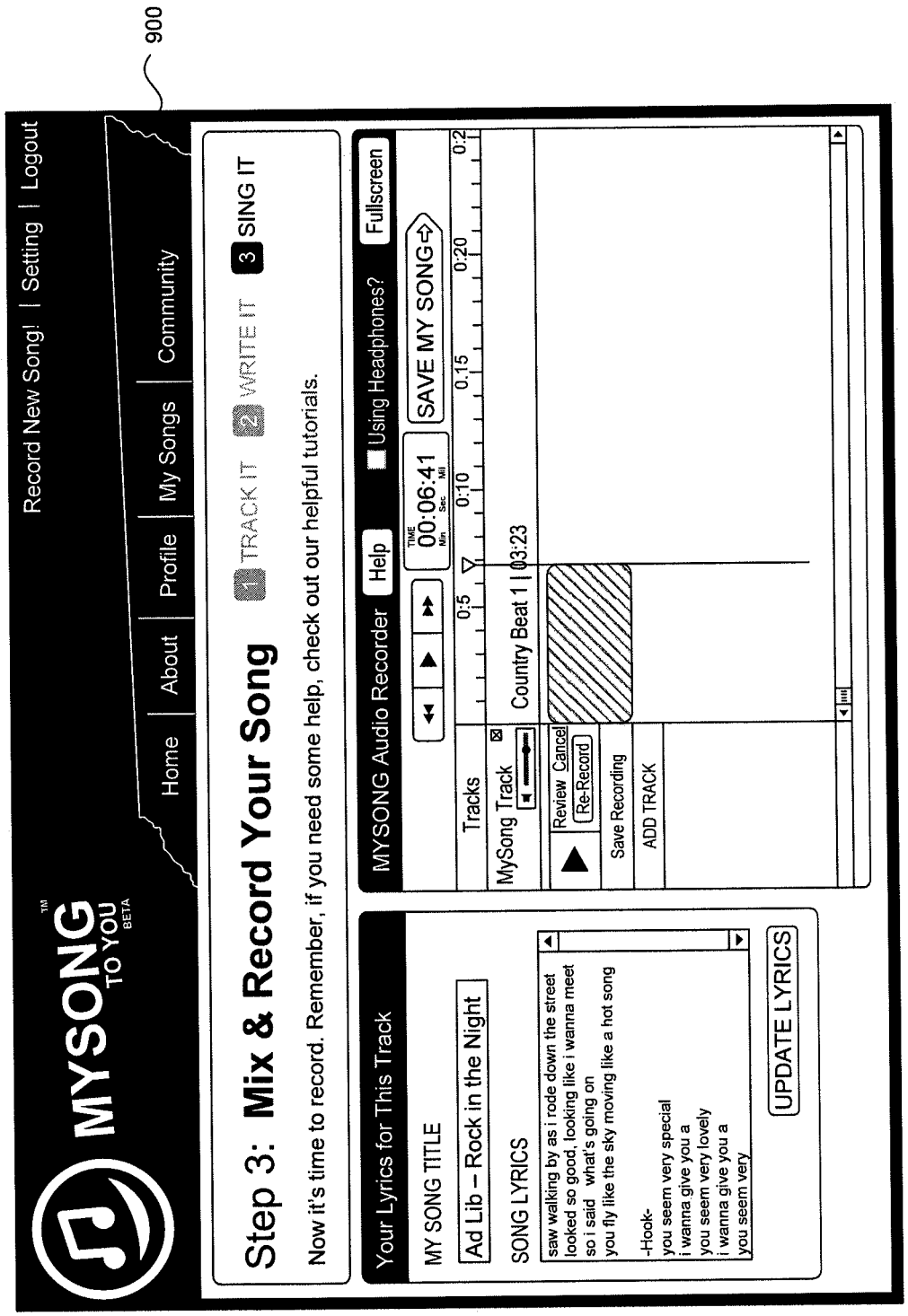
FIG. 9 illustrates an example user interface having an audio/multimedia player/recorder capable of recording, playing, editing, and saving of an audio recording.

FIG. 9 illustrates an example user interface having an audio recorder/player (or multimedia recorder/player) for the recording, playing, editing, and saving of an audio recording. Once the user has completed the recording process, a preview of the audio or video recording can be played back over the network to the user. Typically, the recorded content is stored in a buffer (e.g., memory buffer) when being played for preview.

In the embodiment wherein audio content is created, the user can adjust the volume level of the recorded content based on the preview and the user can apply a special sound effect to audio recorded. The user can also layer or toggle multiple audio recordings by adding another audio recording. If and when the recorded audio recording or video recording is satisfactory to the user, the recording can be permanently saved. If the user chooses to discard the recorded content, the recorded content may be deleted from memory. In some instances, the user can choose to re-record the same content until satisfactory results are obtained.

The user interface display 900 of audio recorder/player may be different before recording, during the recording session, and after the recording session. The different user interface displays are illustrated with further reference to FIG. 8, 9, 10, and FIG. 11. In one embodiment, the player/recorder includes a record button and a stop button. The record button can be used by the recording user to generate an initiation request to start the recording session. The stop button can be used to stop playback of the multimedia content currently being played. A countdown to the initiation of the recording session thus begins. In most instances, if the user is recording over a composition or pre-recorded video recording, the content is played at the initiation of the recording session. The initiation request to record or stop is typically generated by a single action (e.g., a click of the pointing device) on the record or stop button.

The audio/multimedia player/recorder may record without any audio content in the form of acapella. In one embodiment, during the recording session, the player/recorder may include a stop button, a preview button, an indicator of the recording status and a time indicator. The stop button allows a user to generate a termination request to stop the recording session (e.g., by click of a pointing device on the stop button). In one embodiment, the preview button is activated and becomes selectable once the recording session has been stopped. The preview button, when selected, allows the user to listen or view a synchronized result of the audio and video content.

After the recording session, the user is presented with the options of previewing the recording with the selected pre-recorded composition, recording the audio/video content, and/or saving the mixed multimedia content. In one embodiment, when the user saves the recorded content and the recorded content is published. The recording (e.g., audio content, video content) can be saved upon user request, for example, when the user determines that the recording is satisfactory.

Figure 10:
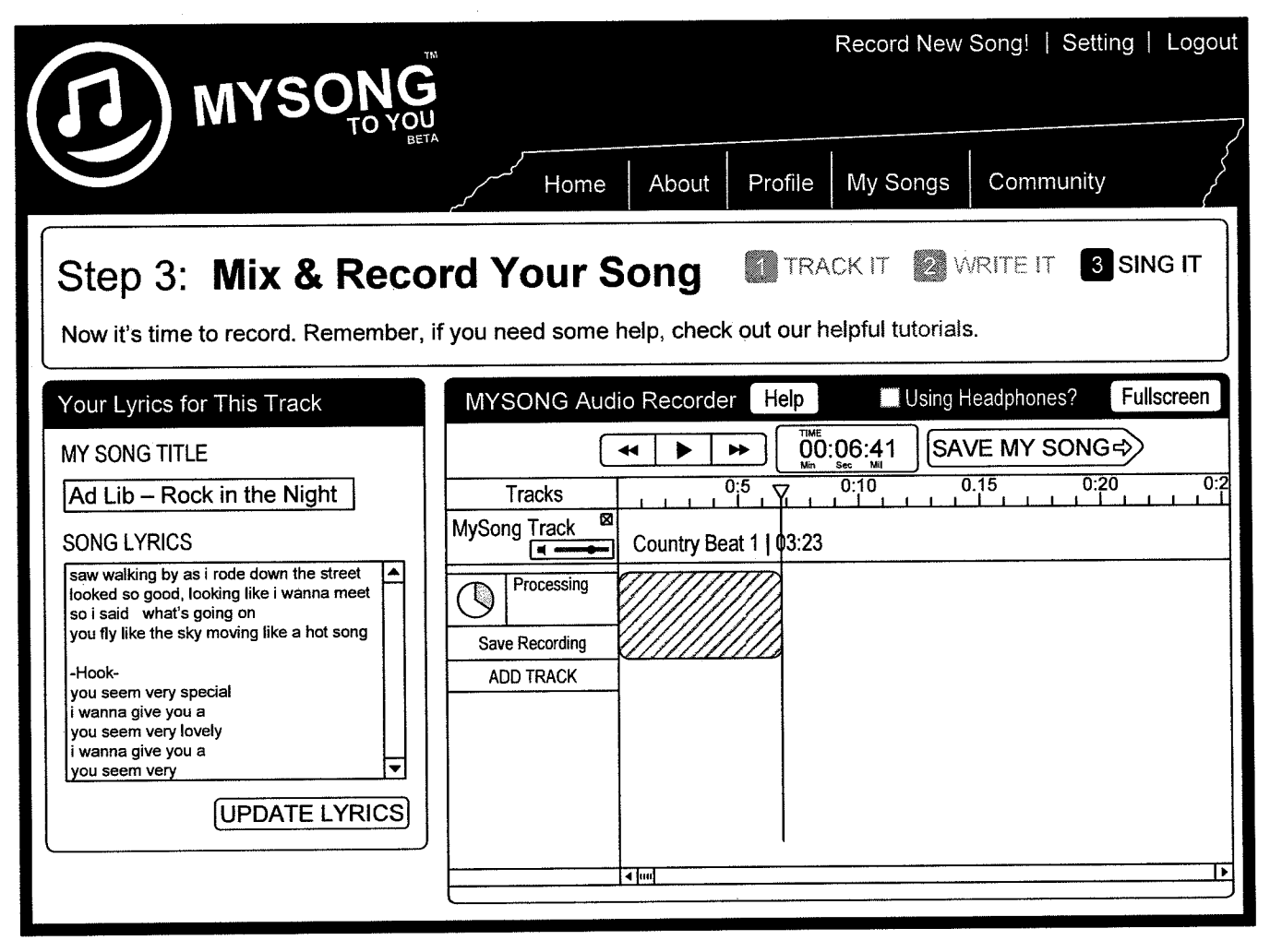

FIG. 10 illustrates an example user interface having an audio/multimedia player/recorder for the processing of an audio recording. The audio recorder/player illustrates the capability of processing the audio recording after recording and the application of, if any, special effects. The duration as well as the timing of the audio recording is displayed in the audio recorder/player, in reference to the pre-recorded composition.

Figure 11:
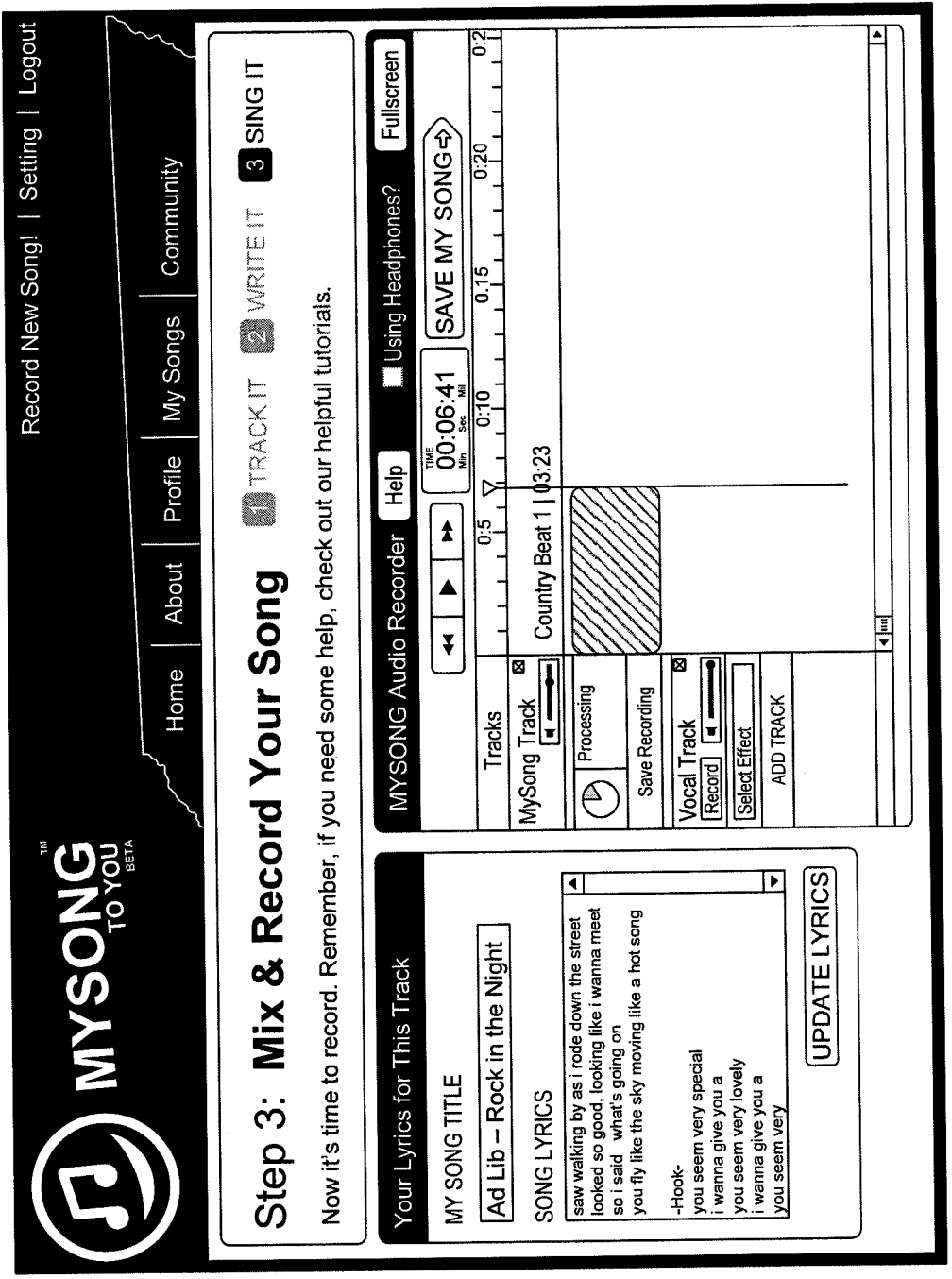
FIG. 11 illustrates an example user interface having an audio/multimedia player/recorder capable of recording an additional audio recording.

FIG. 11 illustrates an example user interface having an audio/multimedia player/recorder for the recording of an additional audio recording. In an embodiment, users have the option to add an additional audio recording to the creation of an audio content. Furthermore, with the option of selecting "add track," a plurality of audio recordings can be added beyond the second audio recording. The process of recording, processing, and applying an effect are identical the descriptions in the aforementioned paragraphs.

Figure 12:
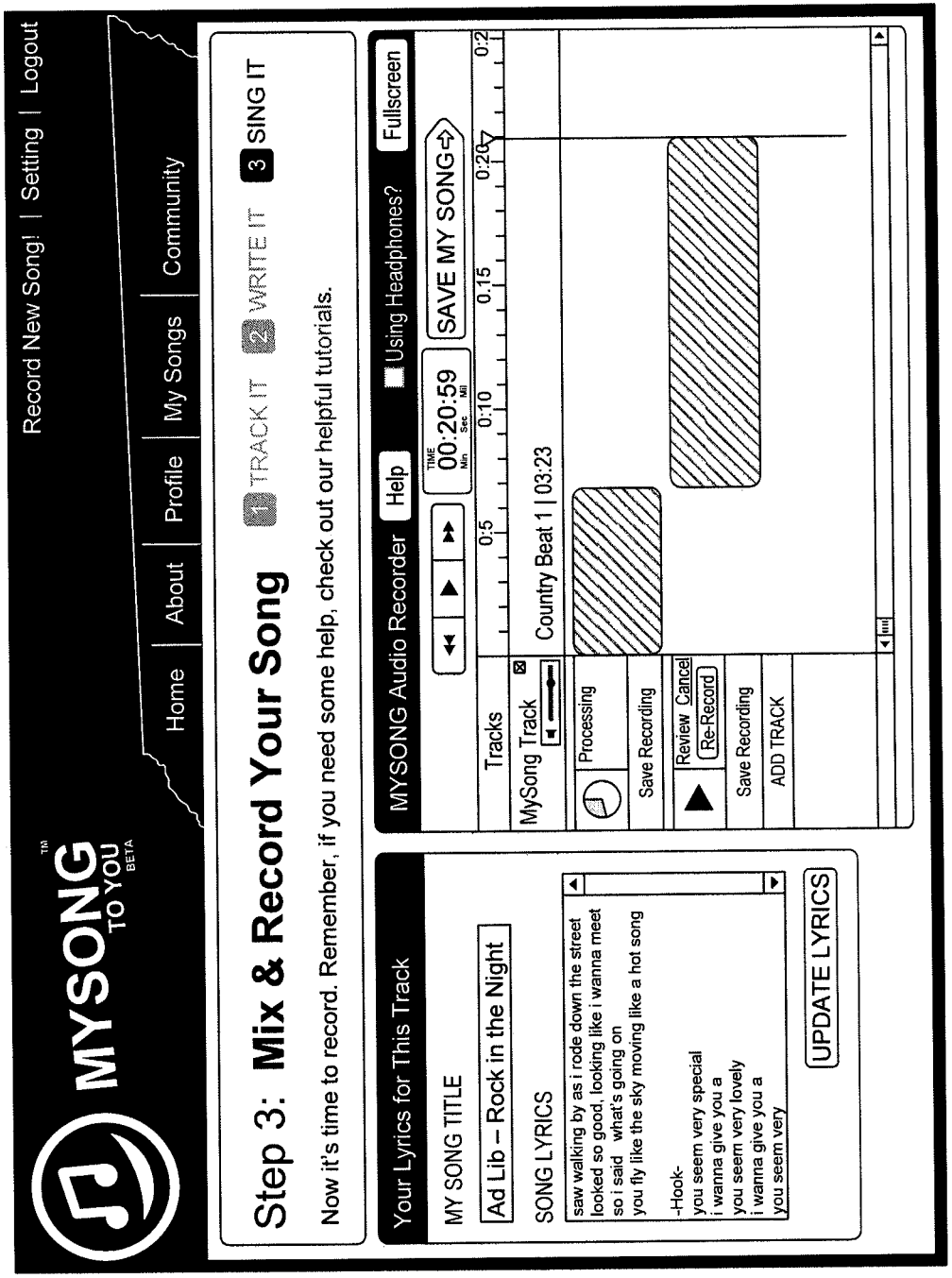
FIG. 12 illustrates an example user interface having an audio/multimedia player/recorder capable of recording, playing, editing, and saving an additional audio recording.

FIG. 12 illustrates an example user interface having an audio/multimedia player/recorder for the recording, playing, editing, and saving of an additional audio recording. The audio recorder/player illustrates a modification of the second audio recording in a way that changes the start of the second recording/track after the end of the first recording/track. Moreover, the second audio recording can still be reviewed, re-recorded, or deleted altogether.

Figure 13:
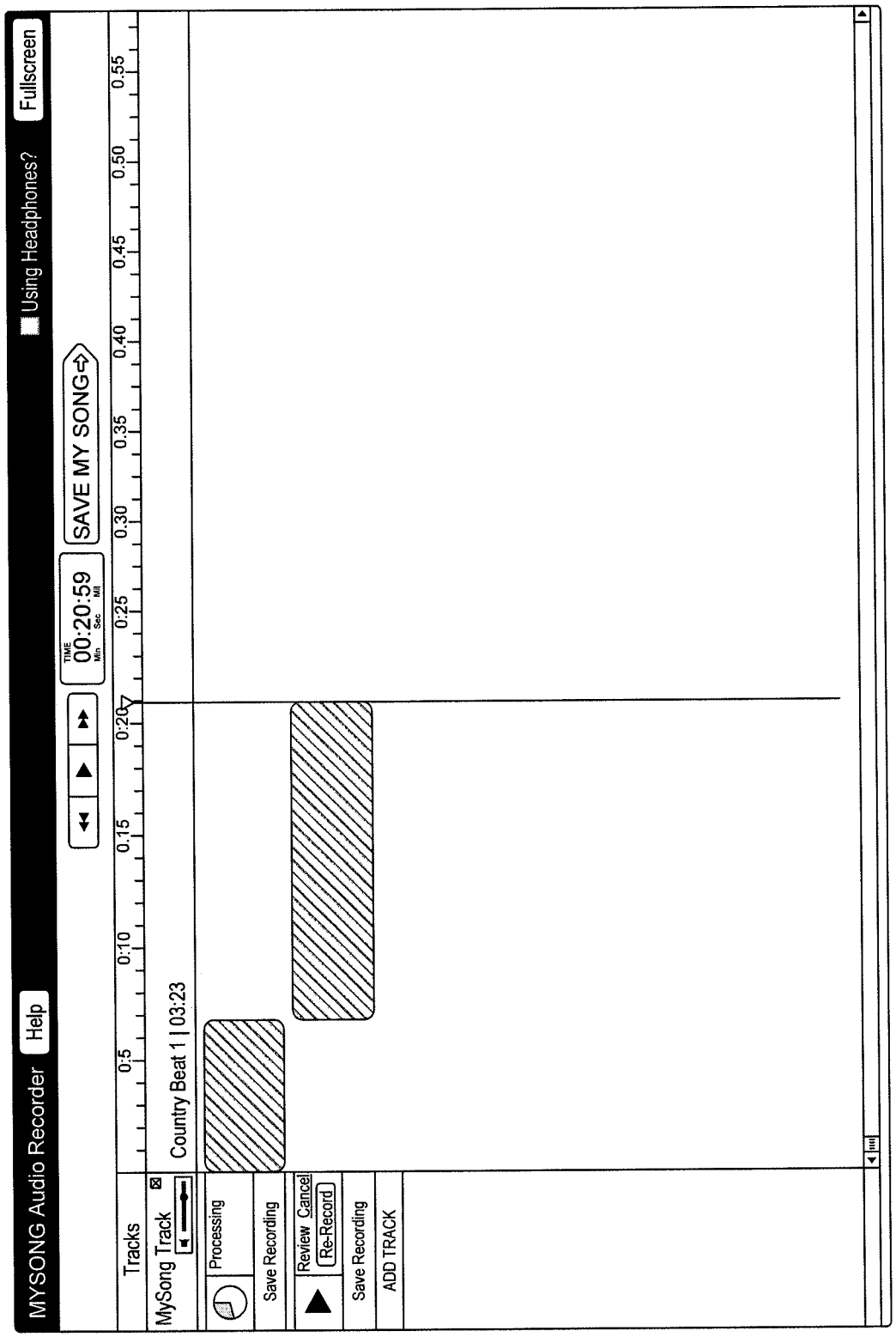
FIG. 13 illustrates an example user interface having an audio/multimedia player/recorder in full-screen mode.

FIG. 13 illustrates an example user interface having an audio/multimedia player/recorder in full-screen mode. In one embodiment, the audio/multimedia player/recorder can be expanded to fill the entire screen of any display peripheral (e.g., monitor on a computer). Likewise, all the functionality can exist for the full-screen version of the embodiment, in addition to the option to use headphones during the audio content process.

Figure 14:
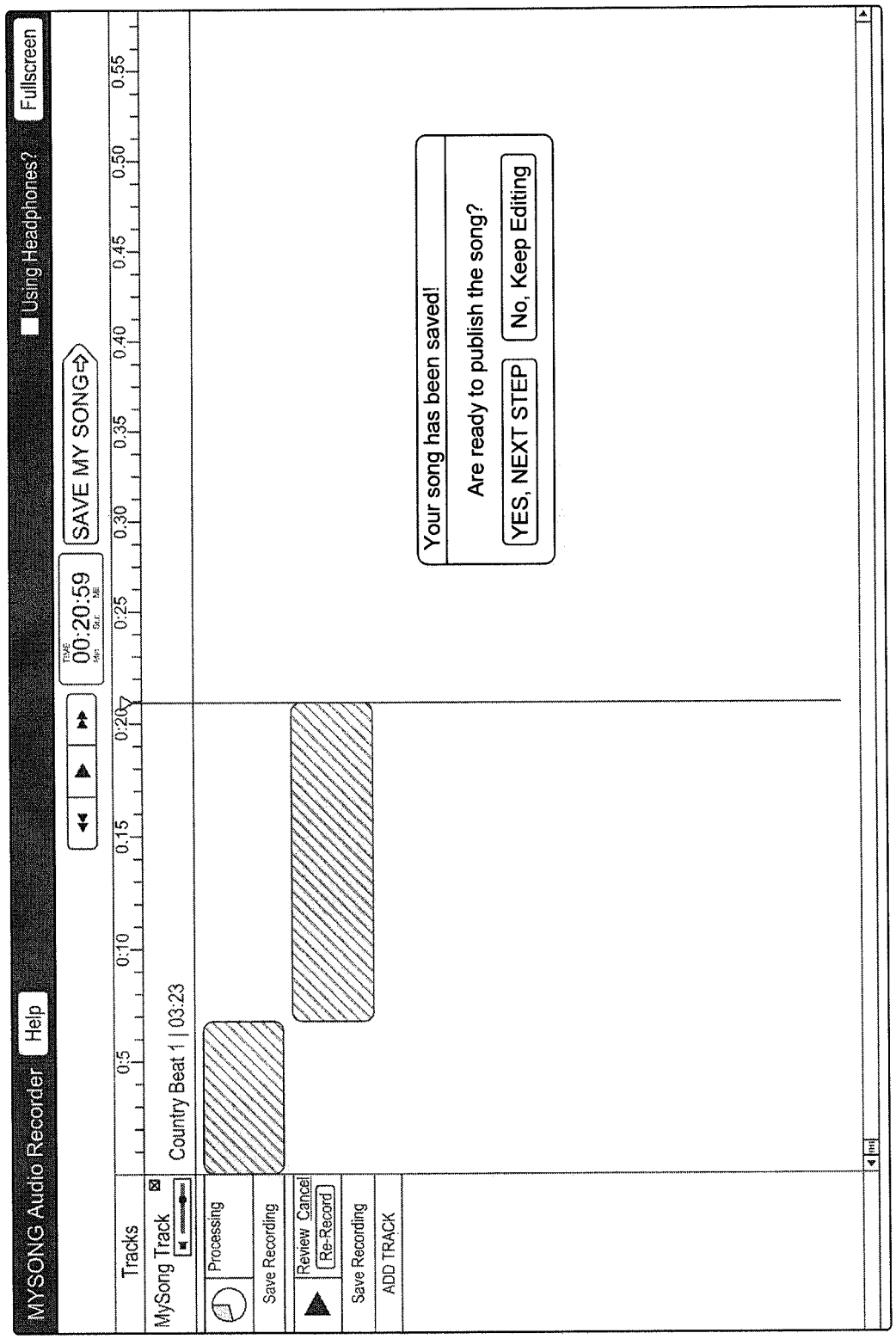
FIG. 14 illustrates an example user interface having an audio/multimedia player/recorder to query the user in regards to publishing the audio content.

FIG. 14 illustrates an example user interface having an audio/multimedia player/recorder to query the user in regards to publishing or continuing the editing of an audio/video creation generated by a user.

After the completion of the editing, saving, and synchronization functions, the audio recorder/player queries the user for a confirmation. In one embodiment, the user can either publish the audio/video content or continue the editing process. In this embodiment, all other options are disabled, except for two possible choices: continuing the modification process until the satisfaction of the user or sharing the audio contenton the network.

Figure 15:
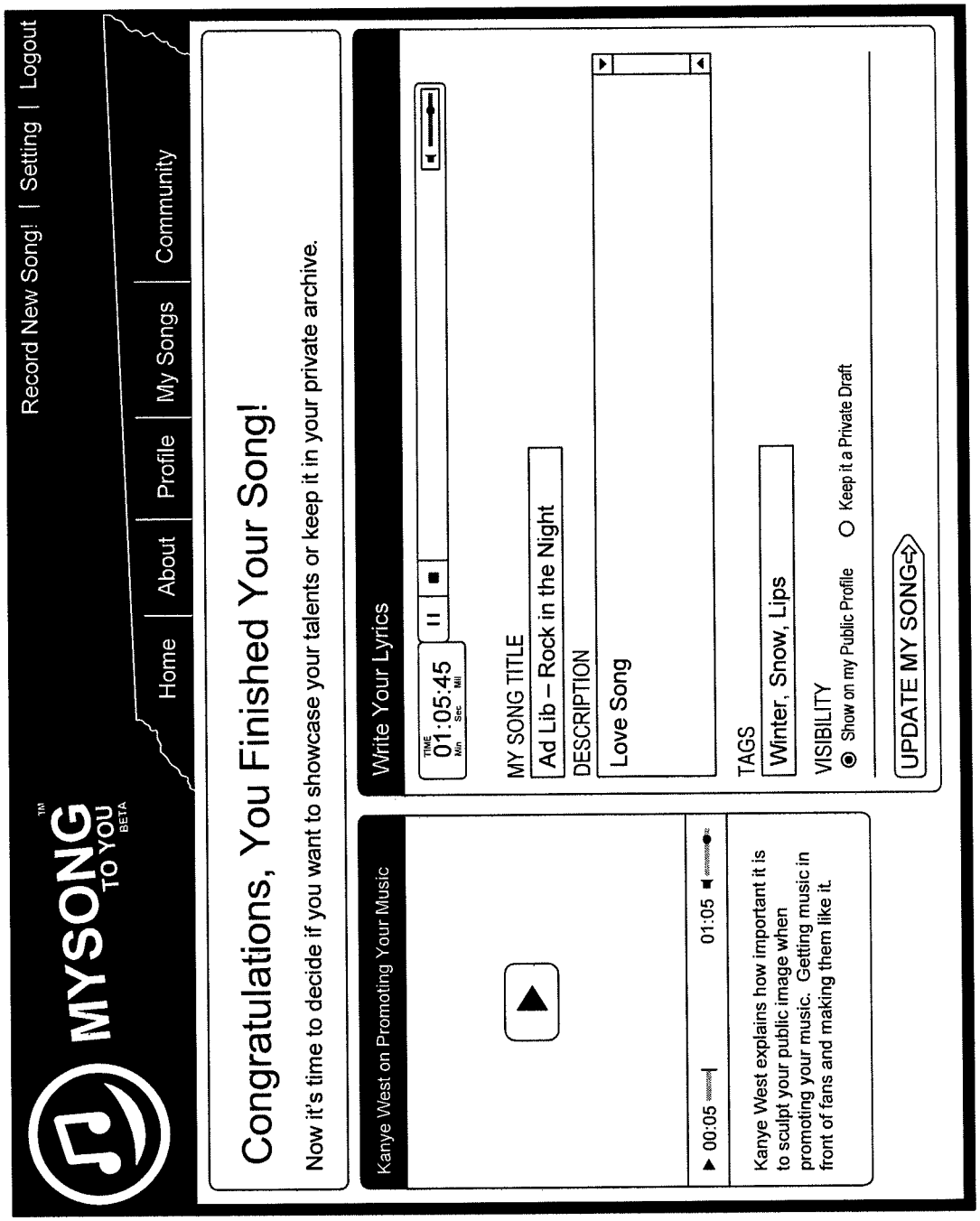
FIG. 15 illustrates an example user interface having an audio/multimedia player/recorder to provide aural playback of a composition.

FIG. 15 illustrates an example user interface having an audio/multimedia player/recorder to provide aural playback of a song composition and to facilitate multimedia content sharing. The graphical user interface 1500 includes many selectable options related to providing an aural playback of the song composition that has been synchronized and a volume control option. Another selectable option in one embodiment is selecting the privacy attributes of the audio content on the network. For example, the song composition may be visible to the public or only visible to the owner. Additional privacy settings that specify rules governing other user's rights to comment, share, or rate it may be configurable by the user as well. Users are also able to modify previously-entered query fields such as titles and/or lyrics. Finally, users can enter new information regarding the audio content's description and associated tags for ease of searching.

Figure 16:
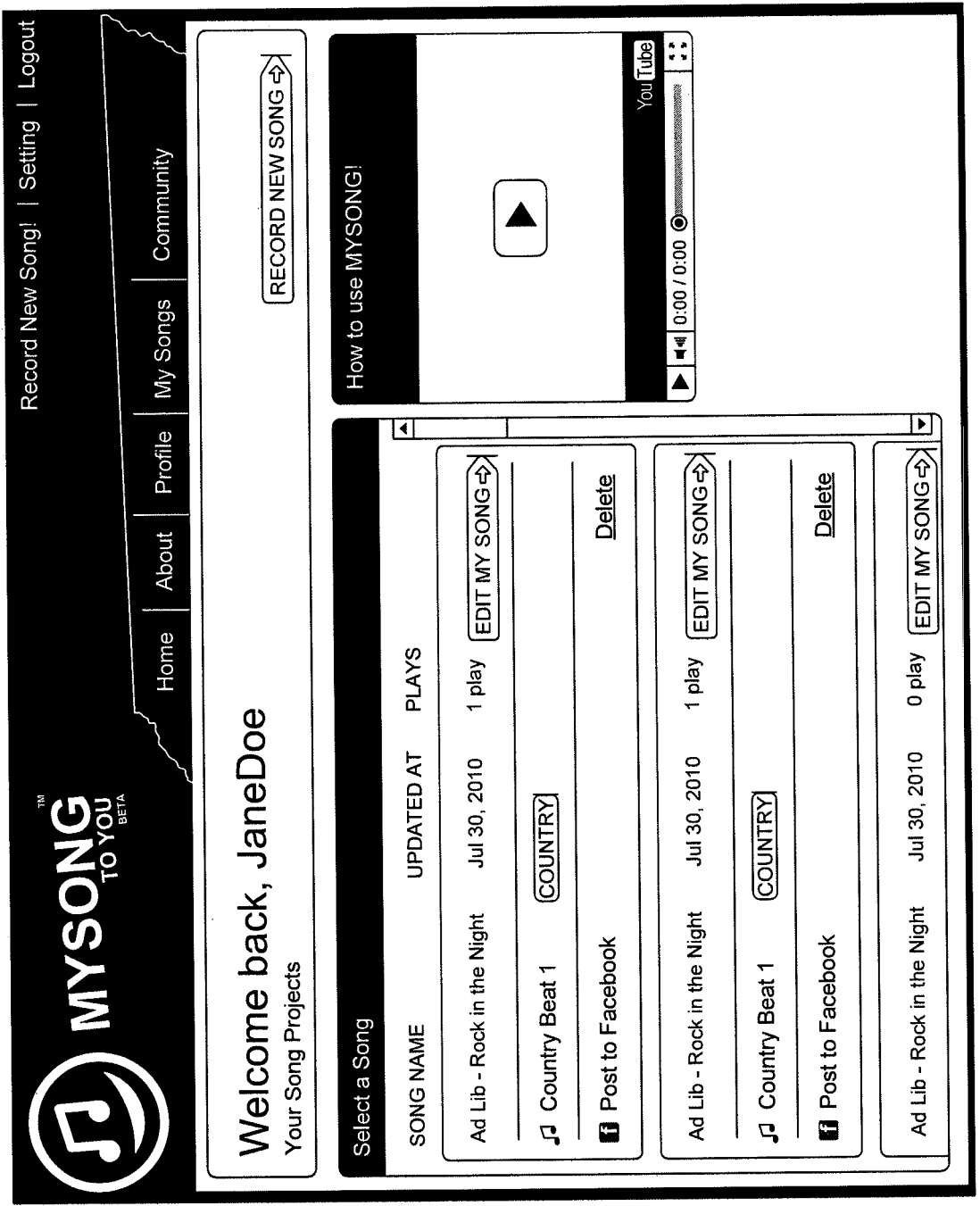
FIG. 16 illustrates an example user interface listing of pre-recorded audio content.

FIG. 16 illustrates an example user interface listing of audio contents generated by a user that was previously recorded. The user interface provides a listing of all completed audio content in the users account. The user has the option to return to the audio content and continue the editing of the audio content or delete the entry in its entirety. Other information that is provided include the most recent date of modification, the category of pre-recorded composition, the number of plays, the audio contents name and finally, aposting option.

In the example of FIG. 16, the "Post to Facebook" option is illustrated. It enables users to send an instance of the audio content to a Facebook account (e.g., to a friend or to him/herself). The instance of the audio content may then be accessed via a link in a Facebook message delivered to a specified Facebook account. In another embodiment, an "embed" option may also be available to a user. The embed option allow users to embed the instance of the audio recorder/player in a site (e.g., MySpace) such that the instance of the widget may be accessed via other sites for multimedia content (e.g., audio, video, etc.) playback or recording purposes.

Figure 17:
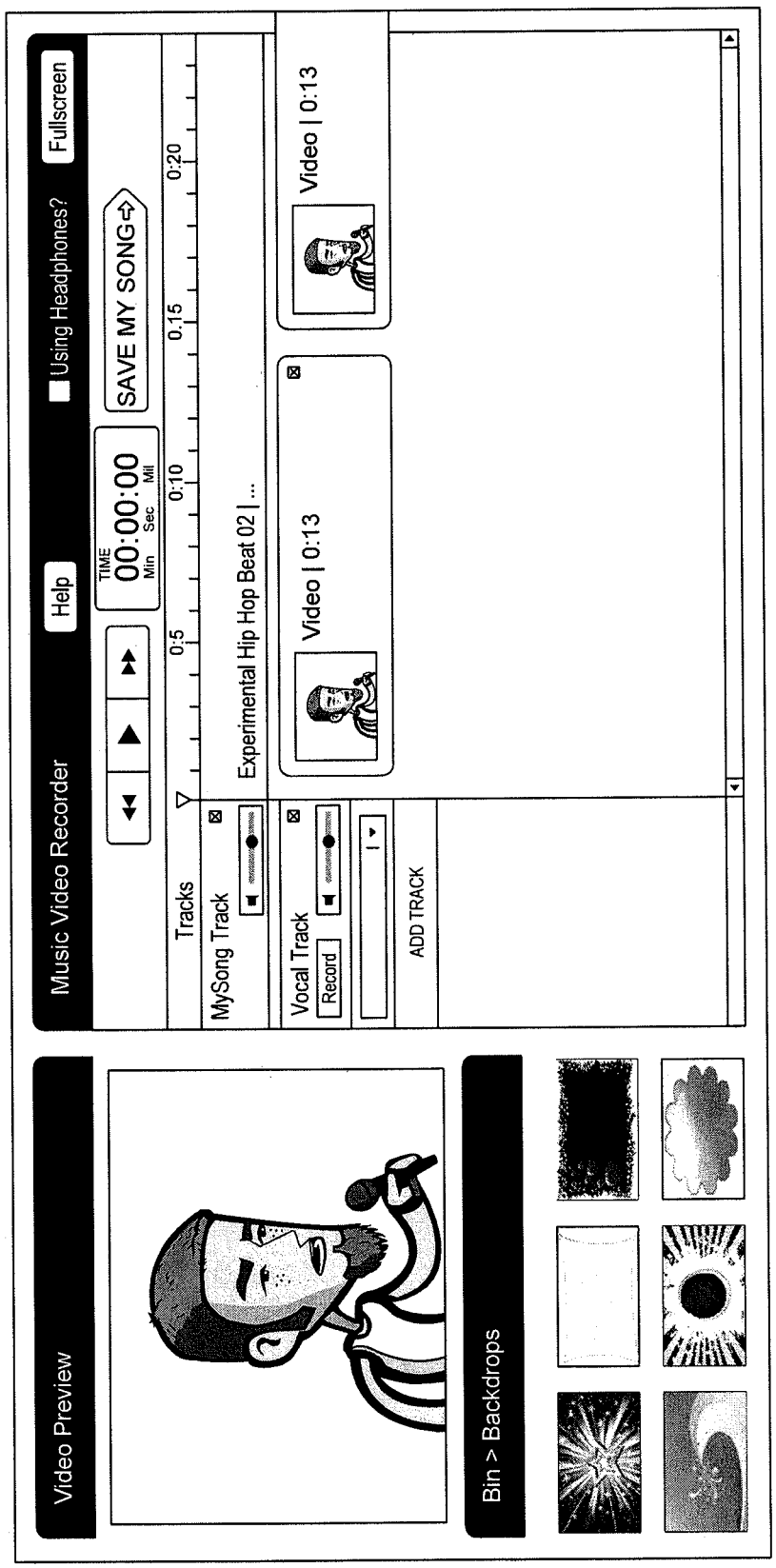
FIG. 17 illustrates an example user interface having a video recorder/player for recording a video recording.

FIG. 17 illustrates an example user interface having a audio/multimedia player/recorder for recording a video recording. The screenshot in FIG. 17 is an example user interface having a audio/multimedia player/recorder suitable for controlling audio/video playback .and recording. The example user interface of screenshot 1700 illustrates the interface while no audio content (e.g., pre-recorded composition, audio recording, pre-recorded video recording) is being played.

Figure 18:
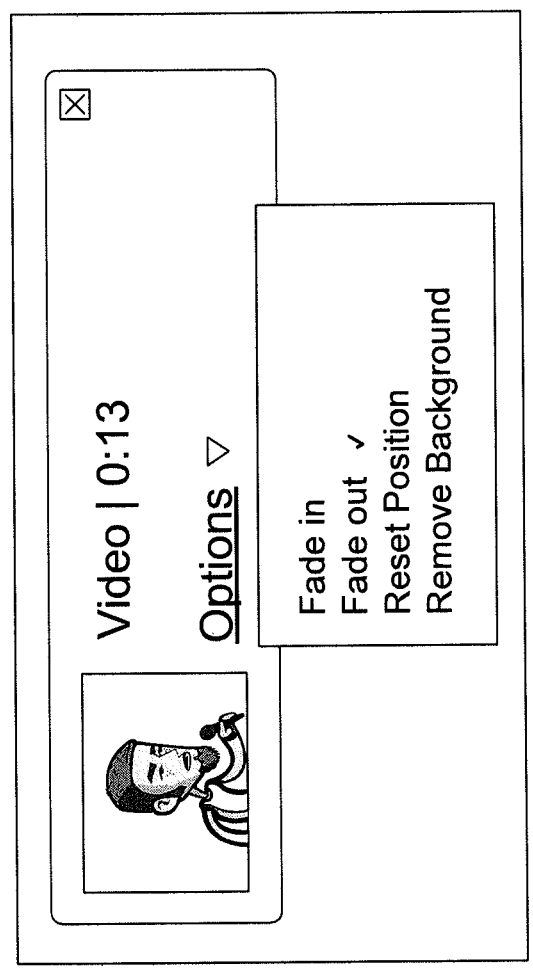
FIG. 18 illustrates an example user interface for editing and/or applying an imaging effect to a video recording.

FIG. 18 illustrates an example user interface for editing a video recording. A video recording can be modified after recording. In one embodiment, options to edit a video recording include: fading in, fading out, resetting the position of a video recording, and superposition of composite images to remove a background. Each listing can, in some instances, include an icon uploaded by the artist.

Figure 19:
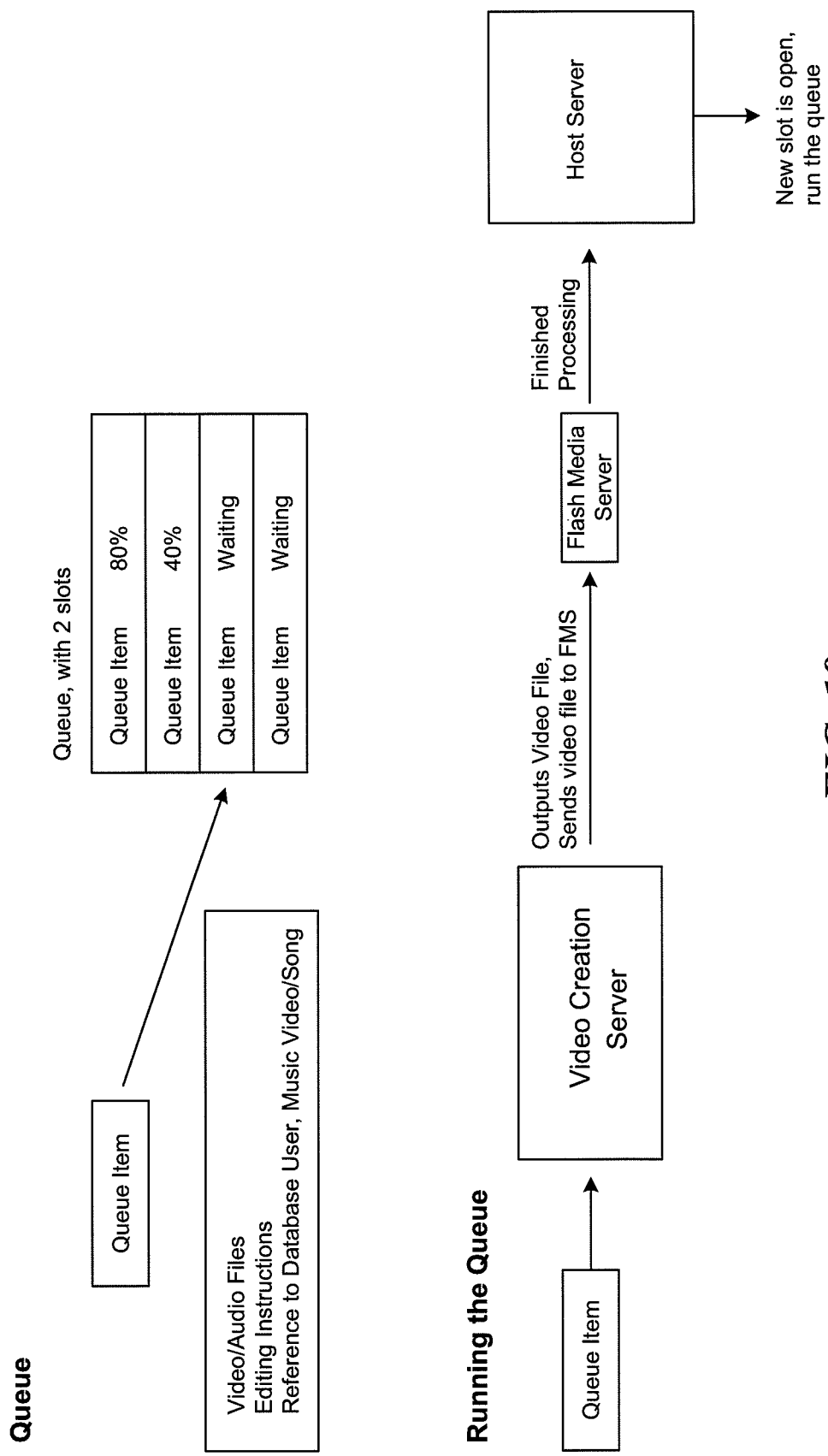
FIG. 19 illustrates the queuing process for a video content in preparation for publishing over the network.

FIG. 19 illustrates the queuing process for a video content in preparation for publishing over a network. In one embodiment, the queue is one manner in which the present technology can handle a certain amount of simultaneous requests to publish. In accordance to this embodiment, when a user requests the synchronization of the composition, audio recording(s), video recording(s), etc., a download request enters the queue, along with editing instructions and user/ content database references. The user can actively check on the progress of the synchronization. The individual components that comprise audio/video content are then processed, encoded, and made streamable over a network for publication. Upon completion of the encoding, the streaming file is moved to a Flash media server coupled to a database and a slot in the queue becomes available.

Figure 20:
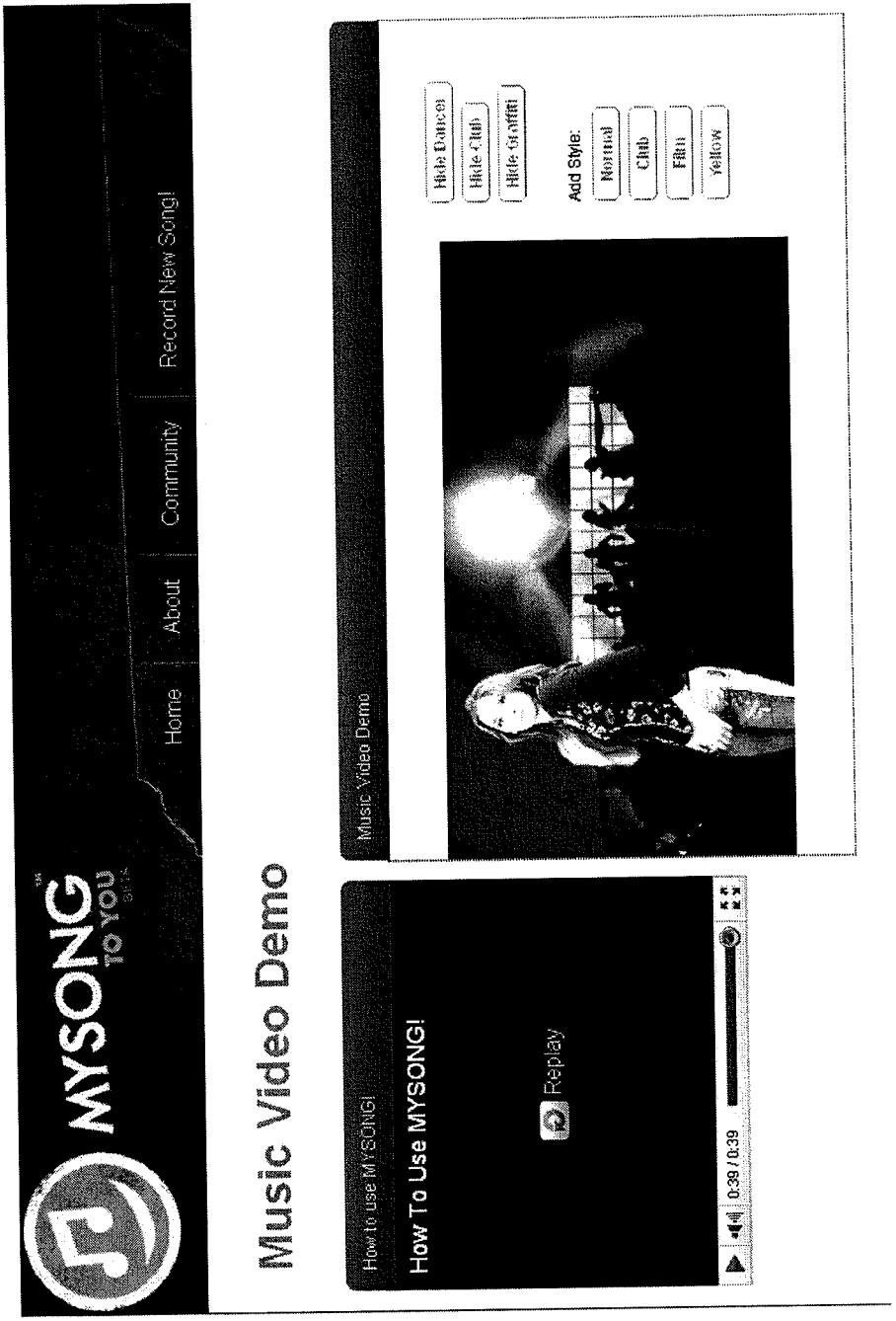
FIG. 20 illustrates an example user interface for the process of chroma key compositing for a video recording.

FIG. 20 illustrates an example user interface for the process of chroma key compositing for a video recording. A pre-recorded video recording is provided to a user to utilize as a background during the video recording. Modifications to the pre-recorded video recording include filtering, color correction, color saturation, speed adjustment, etc. to adapt to a genre of a particular audio content. Upon detection of a video input device (e.g., microphone, camera, webcam, camcorder, transducer, sensor) coupled to the user device, the input device can record an audio and/or video input (e.g., motion, voice, speech, sound, dialogue, music, instruments music, rhythms, song, rap, melody, theatrical performance, movie, play, an act, a skit, etc.) detected by the video input device. In one embodiment, the user interface allows for a technique of compositing two frames together, wherein one image is selectively made transparent to reveal the other image, as well known in the prior art. As a result, the principal subject is recorded against a background of the pre-recorded video recording. The video recording can then be synchronized with the audio content and video content to create a final product. In another embodiment, user movement can be detected by measuring an object or a change in speed in the camera's field of view, as well known in the prior art. The motion can be represented by a trailing light and thus incorporated into a pre-recorded video recording.

Figure 21:
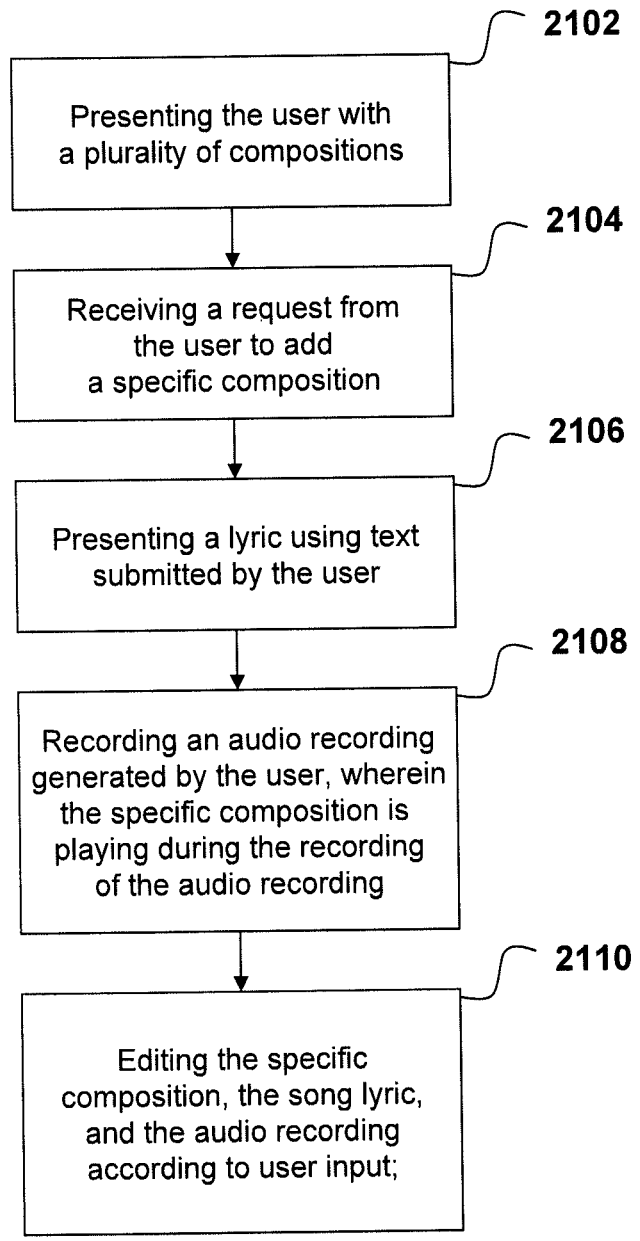
FIG. 21 depicts a flow diagram illustrating an example process of enabling a user to generate audio content over a network.

FIG. 21 depicts a flow diagram illustrating an example process of enabling a user to generate audio content over a network. In process 2102, a user is presented with a plurality of compositions. The requesting user may come across a composition to his/her liking while browsing and listening to the plurality of compositions. While performing playback of the composition, the user can select to record an audio recording over the composition. In process 2104, a request is received from the user to add that specific composition. In process 2106, a lyric using the text submitted by the user is presented and in process 2108, an audio recording generated by the user can be recorded, wherein the specific composition is playing during the recording of the audio recording. Finally, in process 2110, the specific composition, the song lyric, and the audio recording can be edited according to user input. The resulting audio compilation can be previewed by the user and saved.

Figure 22:
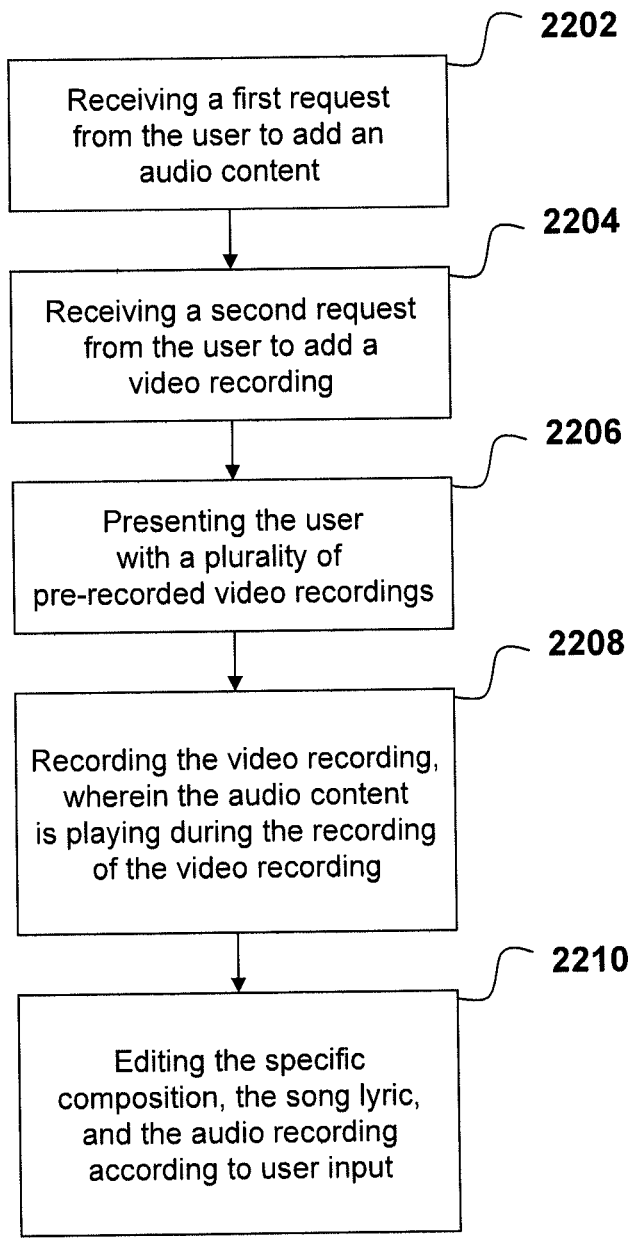
FIG. 22 depicts a flow diagram illustrating an example process of enabling a user to generate audio and video content over a network.

FIG. 22 depicts a flow diagram illustrating an example process of enabling a user to generate audio and video content over a network. In process 2202, a first request is received from the user to add an audio content. The request is typically received over a network. In process 2204, a second request from the user to add a video recording is received. In process 2206, a plurality of pre-recorded video recordings is presented to the user. In process 2208, the video recording can be recorded, wherein the audio content is playing during the recording of the video recording. While recording, audio input into a microphone or web-cam or other imaging device can be recorded in real-time. In process 2210, the specific composition, the song lyric, and the audio recording is edited according to user input.

Figure 23:
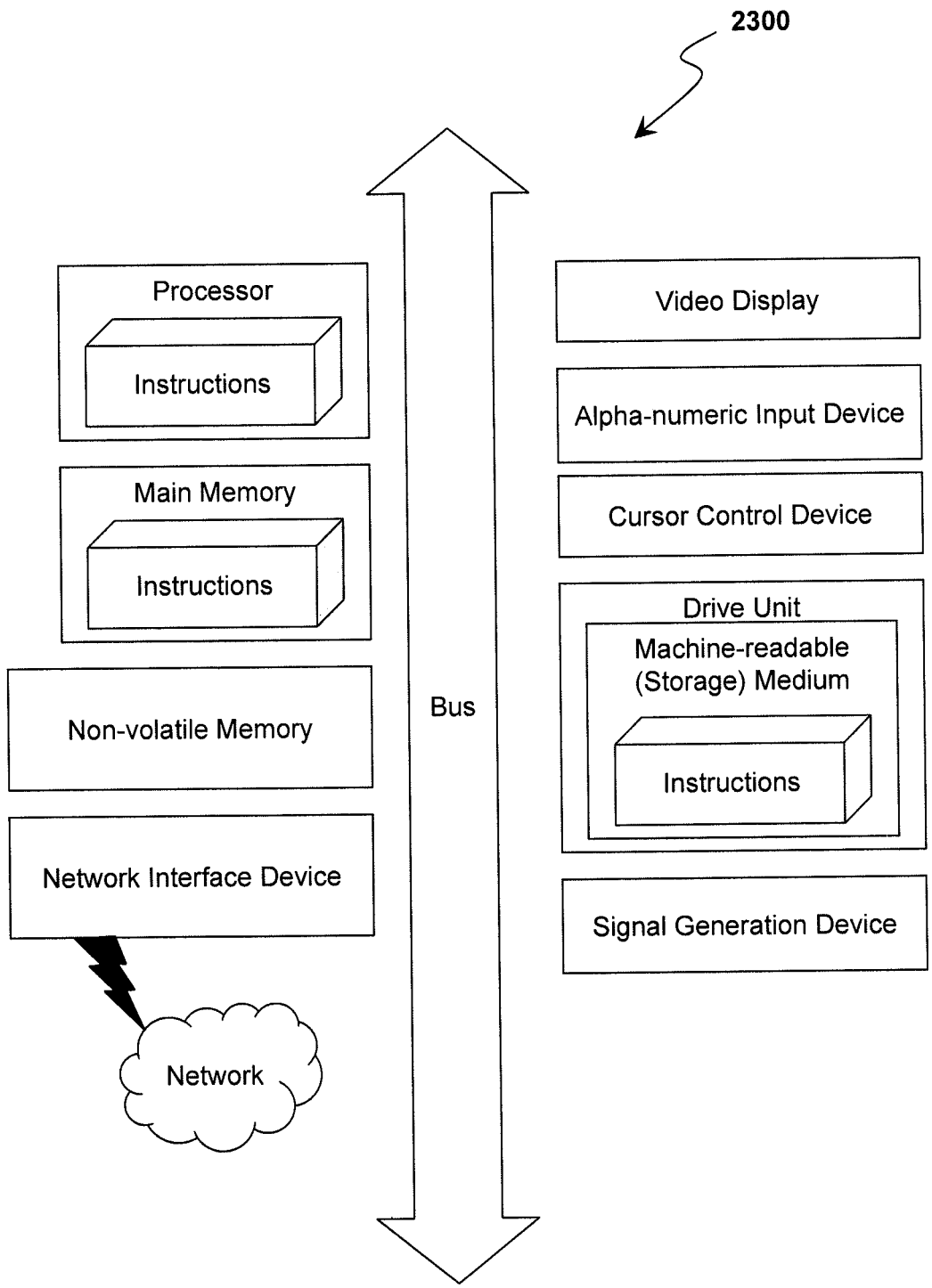
FIG. 23 shows a diagrammatic representation of a machine in the example form of a computer system.

FIG. 23 shows a diagrammatic representation of a machine in the example form of a computer system 2300 within which a set of instructions, for causing the machine to perform any one or more of the methodologies discussed herein, may be executed.

In alternative embodiments, the machine operates as a stand-alone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof.

Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples; alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶13, other aspects may likewise be embodied as a means-plus-function claim, or in other forms, such as being embodied in a computer-readable medium. (Any claims intended to be treated under 35 U.S.C. § 112, ¶13 will begin with the words "means for".) Accordingly, the applicant reserves the right to add additional claims after filing the application to pursue such additional claim forms for other aspects of the disclosure.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

What is claimed is:

1. A method for generating and sharing audio/video content to a social network, comprising:
    initiating a content creation process in response to a request from a user;
    on a recording user interface, prompting the user to record content;
    on an audio selection user interface, prompting the user to select an audio composition from a list of compositions retrieved from a host server;
    on a content creation user interface, presenting the user with a record button;
    on the content creation user interface, presenting the user with a selection of pre-existing visual media content, wherein upon selecting an instance of pre-existing visual media content from the selection, uses the content creation interface to selectively edit the instance of pre-existing visual media content;
    providing simultaneous aural playback of the audio composition during a recording session, thereby permitting the user to hear the composition during the recording session;
    generating composited recorded content based on the recording session by compositing video captured during the recording session with the instance of pre-existing visual media content combined;
    on the content editing user interface, displaying a preview of the composited recorded content to the user, wherein the preview of the composited recorded content enables the user to change the timing or latency of the composited recorded content relative to the selected audio composition;
    on a privacy user interface, presenting a privacy attribute selection for the composited recorded content;
    on a publication user interface, presenting a query to request to publish the composited recorded content;
    in response to the request to publish, processing and encoding individual components of the composited recorded content to create a streamable video; and
    publishing the streamable video by copying the streamable video to a media server, from which the streamable video is viewable according to the privacy attribute; and wherein the recording, audio selection, content editing, privacy, and publication user interfaces are different from one another and form part of the same application.

2. The method of claim 1, further comprising the step of terminating the recording session after a duration of time has elapsed.

3. The method of claim 1, wherein the interface to selectively edit the pre-existing visual media content comprises an interface to selectively remove an element of the instance of pre-existing visual media content.

4. The method of claim 1, further comprising the step of locally saving the streamable video.

5. The method of claim 1, wherein the step of generating the composited recorded content is executed by a client device controlled by the user.

6. The method of claim 1, wherein the audio composition comprises pre-recorded audio.

7. The method of claim 1, wherein the preview is stored in temporary memory and re-written to non-transient memory upon receiving a save request from the user.

8. The method of claim 1, further comprising the steps of:
displaying a countdown to the recording session based on a user interaction with the record button, wherein the recording session comprises video recording; and
providing the user an indication of the initiation of the recording session after the countdown to the recording session has counted down.

9. The method of claim 1, further comprising associating user-defined tags with the streamable video.

10. A method for generating and sharing audio/video content to a social network, comprising:
initiating a content creation process in response to a request from a user;
on a recording user interface, prompting the user to record content;
on an audio selection user interface, prompting the user to select an audio composition from a list of compositions retrieved from a host server;
on a content creation user interface, presenting the user with a record button;
on the content creation user interface, displaying a countdown to a recording session based on a user interaction with the record button, wherein the recording session comprises video recording;
on the content creation user interface, providing the user an indication of the initiation of the recording session after the countdown to the recording session has counted down;
providing simultaneous aural playback of the audio composition during the recording session, thereby permitting the user to hear the composition during recording;
generating composited recorded content based on the recording session by compositing video captured during the recording session with pre-existing visual media content;
on the content creation user interface, displaying a preview of the composited recorded content to the user, wherein the preview of the composited recorded content enables the user to change the timing or latency of the composited recorded content relative to the selected audio composition;
on a privacy user interface, presenting a privacy attribute selection for the composited recorded content;
on a publication user interface, presenting a query to publish the composited recorded content;
in response to a request to publish, processing and encoding individual components of the composited recorded content to create a streamable video;
publishing the streamable video by copying the streamable video to a media server, thereby sending the composited recorded content to the host server, wherein the host server is configured to store multimedia content to facilitate access to other users according to the privacy attribute and
wherein the recording, audio selection, content creation, privacy, and publication user interfaces are different from one another and form part of the same application.

11. The method of claim 10, wherein the preview is stored in temporary memory and re-written to non-transient memory upon receiving a save request from the user.

12. The method of claim 10, wherein the step of generating the composited recorded content is executed by a client device controlled by the user.

13. A method for generating and sharing audio/video content to a social network, comprising:
initiating a content creation process in response to a request from a user;
on a recording user interface, prompting the user to record content;
on an audio selection user interface, prompting the user to select an audio composition from a list of compositions retrieved from a host server;
on a content creation user interface, presenting the user with a record button;
beginning a recording session based on a user interaction with the record button, wherein the recording session comprises video recording;
on the content creation user interface, providing the user an indication of the initiation of the recording session;
on the content creation user interface, providing simultaneous aural playback of the audio composition during the recording session, thereby permitting the user to hear the composition during recording;
generating recorded content based on the recording session;
on the content creation user interface, displaying a preview of the recorded content to the user, wherein the preview of the recorded content enables the user to set an imaging effect for the recorded content;
on a privacy user interface, presenting a privacy attribute selection for the recorded content;
on a publication user interface, presenting a query to request to publish the recorded content;
in response to the request to publish, processing and encoding individual components of the recorded content to create a streamable video; and
publishing the streamable video by copying the streamable video to a media server, thereby facilitating access to the streamable video to other users according to the selected privacy attribute; and
wherein the recording, audio selection, content creation, privacy, and publication user interfaces are different from one another and form part of the same application.

14. The method of claim 13, wherein the user setting an imaging effect for the recorded content comprises adding a fade-in effect.

15. The method of claim 13, wherein the user setting an imaging effect for the recorded content comprises removing a fade-in effect.

16. The method of claim 13, wherein the user setting an imaging effect for the recorded content comprises compositing the recorded content with pre-existing visual media content.

17. The method of claim 13, wherein the step of generating the recorded content is executed by a client device controlled by the user.

\* \* \* \* \*